(12) United States Patent
Hampel et al.

(10) Patent No.: US 10,009,260 B2
(45) Date of Patent: Jun. 26, 2018

(54) MANAGEMENT OF NETWORK ROUTING DOMAINS IN COMMUNICATION NETWORKS

(71) Applicant: QUALCOMM Incorporated, San Diego, CA (US)

(72) Inventors: Karl Georg Hampel, New York, NY (US); Vincent Park, Budd Lake, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 14/945,159

(22) Filed: Nov. 18, 2015

(65) Prior Publication Data

US 2017/0005913 A1    Jan. 5, 2017

Related U.S. Application Data

(60) Provisional application No. 62/186,985, filed on Jun. 30, 2015.

(51) Int. Cl.
| | |
|---|---|
| *H04L 12/26* | (2006.01) |
| *H04L 12/709* | (2013.01) |
| *H04L 12/721* | (2013.01) |
| *H04W 40/32* | (2009.01) |
| *H04L 12/715* | (2013.01) |

(52) U.S. Cl.
CPC ............ *H04L 45/245* (2013.01); *H04L 45/04* (2013.01); *H04L 45/124* (2013.01); *H04L 45/46* (2013.01); *H04W 40/32* (2013.01)

(58) Field of Classification Search
CPC ........ H04L 45/02; H04W 84/18; H04W 40/32
See application file for complete search history.

(56) References Cited

U.S. PATENT DOCUMENTS

| | | | |
|---|---|---|---|
| 2005/0094577 A1* | 5/2005 | Ashwood-Smith | ..... H04L 45/02 370/257 |
| 2009/0059816 A1 | 3/2009 | Reza et al. | |
| 2011/0164527 A1 | 7/2011 | Mishra et al. | |
| 2012/0307825 A1 | 12/2012 | Hui et al. | |
| 2016/0119251 A1* | 4/2016 | Solis | ................... H04L 43/0876 709/224 |

OTHER PUBLICATIONS

International Search Report and Written Opinion—PCT/US2016/040184—ISA/EPO—dated Sep. 23, 2016.

* cited by examiner

*Primary Examiner* — Kevin C Harper
(74) *Attorney, Agent, or Firm* — Loza & Loza, LLP

(57) ABSTRACT

Aspects of the disclosure relate to network management in communication networks, including but not limited to wireless communication networks including integrated access and backhaul (IAB) nodes within an IAB backhaul network. For example, a network node may determine to integrate a peer node, to which the network node has physical connectivity, into a network routing domain of which the routing node is a member. In another example, a network node may determine to truncate a peer node from a network routing domain. In various examples, the decisions to propagate or truncate the network routing domain may be made based on routing messages within a network routing domain, or in a plurality of overlapping network routing domains. In further examples, the decisions may be based on information about physical links between respective nodes.

30 Claims, 18 Drawing Sheets

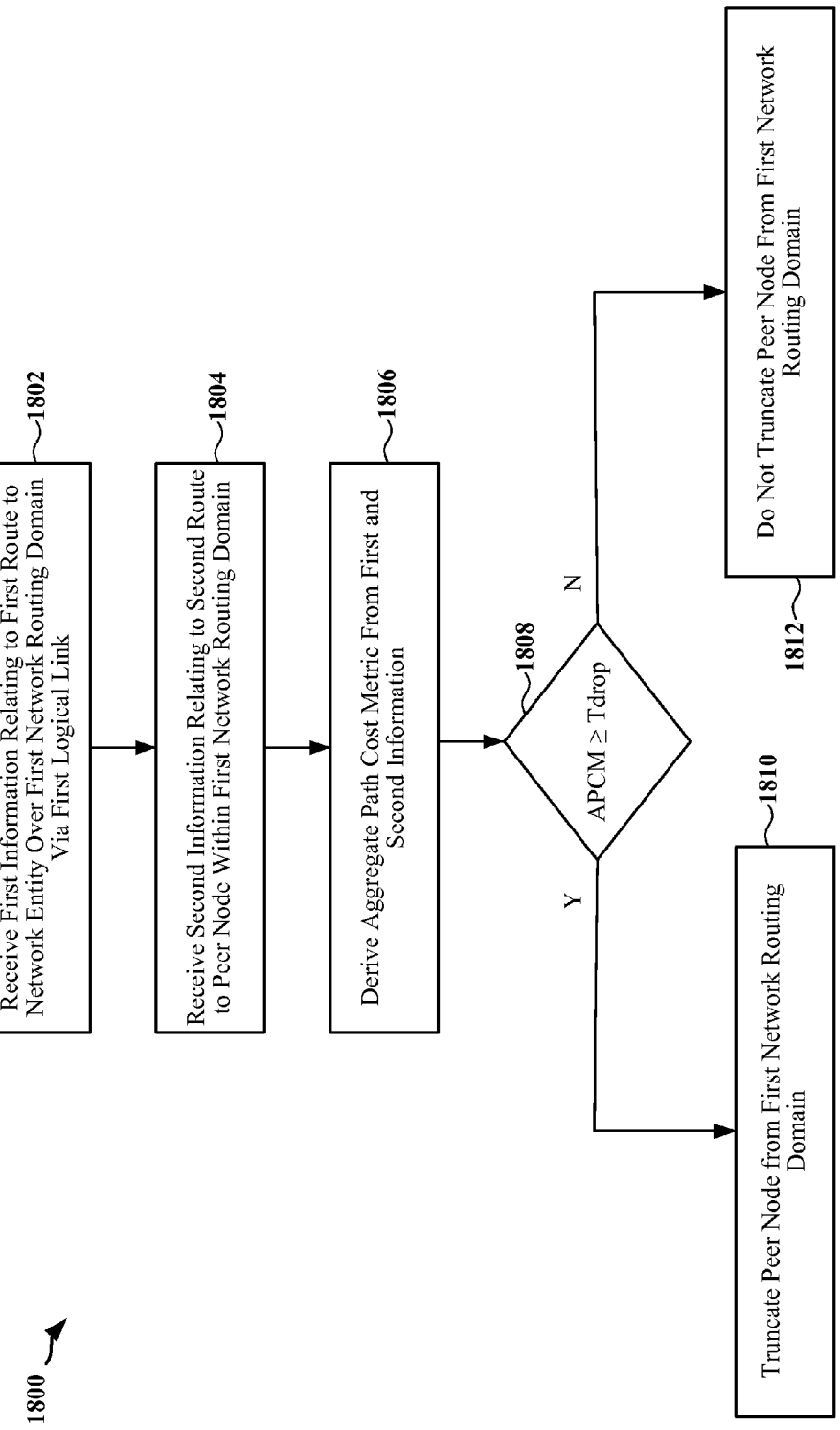

MANAGEMENT OF NETWORK ROUTING DOMAINS IN COMMUNICATION NETWORKS

PRIORITY CLAIM

The present application for patent claims priority to Provisional Application No. 62/186,985 entitled "Autonomous Adjustment of Routing Domains in Wireless Backhaul Networks" filed Jun. 30, 2015, and assigned to the assignee hereof and hereby expressly incorporated by reference herein.

TECHNICAL FIELD

The technology discussed below relates generally to communication systems, and more particularly, to management of network routing domains in wireless backhaul networks.

BACKGROUND

Wireless communication networks are widely deployed to provide various communication services such as telephony, video, data, messaging, broadcasts, and so on. In a typical example, wireless communication networks provide for wireless communication between user equipment (UE), such as mobile phones, and network nodes, such as base stations, utilizing a wireless access interface. The access traffic flow (voice and/or data) communicated over the wireless access interface is further communicated between the base station and a mobile core network utilizing a suitable backhaul network, which is typically a wired network, a fiber network, a microwave network, or some combination of these.

To reduce vulnerability of network nodes to link failures or congestion within a mobile backhaul network, overlapping network routing domains may be implemented to provide redundancy in the overlap regions between the network routing domains. Routing between the network routing domains is achieved using logical links overlaid on physical links between the network nodes. Membership in a particular network routing domain may be based on the physical connectivity between network nodes. For example, as part of the physical layer discovery, one or more logical links may be established to the corresponding network routing domains. Logical links may also be manually configured when network nodes are added or removed. However, when changes in link conditions or network topology occur, reconfiguration of the overlapping network routing domains may be desired.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for management of network routing domains in communication networks. For example, a network node may determine to propagate a network routing domain of which the network node is a member to a peer node. In another example, a network node may determine to remove or truncate a peer node or itself from a network routing domain. In various examples, the decisions to propagate or truncate the network routing domain may be made based on routing messages within a network routing domain, or in a plurality of overlapping network routing domains. In further examples, the decisions may be based on information about physical links between respective nodes.

In one aspect, the disclosure provides a method for managing a first network routing domain within a communication network, operable at a network node having connectivity to a network entity utilizing a first logical link associated with the first network routing domain. The method includes: receiving first information relating to a first route between the network node and the network entity via the first network routing domain, receiving second information relating to a second route between the network node and a first peer node outside of the first network routing domain, determining to propagate the first network routing domain to the first peer node, based on the first information and the second information, and establishing a second logical link with the first peer node, in which the second logical link is associated with the first network routing domain. The method further includes: exchanging the first information and the second information between the first logical link and the second logical link, and forwarding traffic between the first logical link and the second logical link utilizing a first peer route derived from the first information and the second information.

Another aspect of the disclosure provides a network node within a communication network. The network node includes a wireless transceiver configured to communicate with a network entity via a first logical link overlaid on a wireless link, in which the first logical link is associated with the first network routing domain. The network node further includes at least one processor communicatively coupled to the wireless transceiver. The at least one processor is configured to receive first information relating to a first route between the network node and the network entity via the first network routing domain, receive second information relating to a second route between the network node and a first peer node outside of the first network routing domain, determine to propagate the first network routing domain to the first peer node, based on the first information and the second information, and establish a second logical link with the first peer node, in which the second logical link is associated with the first network routing domain. The at least one processor is further configured to exchange the first information and the second information between the first logical link and the second logical link, and forward traffic between the first logical link and the second logical link utilizing a first peer route derived from the first information and the second information.

Another aspect of the disclosure provides a network node within a communication network having connectivity to a network entity utilizing a first logical link associated with a first network routing domain. The network node includes means for receiving first information relating to a first route between the network node and the network entity via the first network routing domain, means for receiving second information relating to a second route between the network node and a first peer node outside of the first network routing domain, means for determining to propagate the first network routing domain to the first peer node, based on the first information and the second information, and means for establishing a second logical link with the first peer node, in which the second logical link is associated with the first network routing domain. The network node further includes means for exchanging the first information and the second information between the first logical link and the second logical link, and means for forwarding traffic between the first logical link and the second logical link utilizing a first peer route derived from the first information and the second information.

Another aspect of the disclosure provides a non-transitory computer-readable medium storing computer executable code. The non-transitory computer-readable medium includes code for receiving first information relating to a first route between a network node and a network entity via a first network routing domain, in which the network node has connectivity to the network entity via a first logical link associated with the first network routing domain. The non-transitory computer-readable medium further includes code for: receiving second information relating to a second route between the network node and a first peer node outside of the first network routing domain, determining to propagate the first network routing domain to the first peer node, based on the first information and the second information, and establishing a second logical link with the first peer node, in which the second logical link associated with the first network routing domain. The non-transitory computer-readable medium further includes code for exchanging the first information and the second information between the first logical link and the second logical link, and forwarding traffic between the first logical link and the second logical link utilizing a first peer route derived from the first information and the second information.

Examples of additional aspects of the disclosure follow. In some aspects, the network node further provides connectivity to the network entity utilizing a third logical link associated with a second network routing domain within the communication network, receives third information related to a third route between the network node and the network entity via the second network routing domain, and selects at least the first network routing domain to be propagated to the first peer node based on the first information, the second information, and the third information. In some aspects, the network node further selects both the first network routing domain and the second network routing domain to be propagated to the first peer node based on the first information, the second information, and the third information, and establishes a fourth logical link with the first peer node, in which the fourth logical link associated with the second network routing domain. The network node further exchanges the second information and the third information between the third logical link and the fourth logical link, and forwards traffic between the third logical link and the fourth logical link utilizing a second peer route derived from the second information and the third information In some aspects, the network node selects the first network routing domain to be propagated to the first peer node over the second network routing domain based on the first information and the third information. In some aspects the network node selects the first network routing domain over the second network routing domain based on a comparison between a first path cost metric based on the first information and the second information and a second path cost metric based on the second information and the third information. In some aspects, the network node further determines a first path cost metric based on the first information and the second information, and determines to propagate the first network routing domain to the first peer node when the first path cost metric compares favorably with a first path cost threshold.

In some aspects, the first information includes at least one of route metrics related to the first route, link metrics related to at least one physical link along the first route or domain metrics related to the first network routing domain. In some aspects, the second information includes at least one link metric related to a link quality of a physical link between the network node and the first peer node. In some aspects, the second logical link is overlaid on the physical link. In some aspects, the physical link between the network node and the first peer node is a wireless link. In some aspects, the network entity corresponds to a remote network or a destination node within the first network routing domain or the remote network. In some aspects, the network node is an integrated access backhaul (IAB) node and the communication network is an IAB network.

In some aspects, the network node further determines, based on the first information and fourth information relating to a fourth route between the network node and a second peer node within the first network routing domain, to remove the second peer node from the first network routing domain, and tears down a fifth logical link associated with the first network routing domain between the network node and the second peer node. In some aspects, the network node further determines a third path cost metric based on the first information and the fourth information, and determines to remove the second peer node from the first network routing domain when the third path cost metric compares unfavorably with a second path cost threshold.

In some aspects, the network node further receives fifth information related to a fifth route between the second peer node and the network entity via the second network routing domain, and selects the second peer node to be removed from the first network routing domain over the second network routing domain based on the first information, the fourth information, and the fifth information. In some aspects, the network node further provides a fifth logical link associated with the first network routing domain between the network node and a second peer node, and tears down at least the fifth logical link associated with the first network routing domain upon the second peer node determining to remove itself from the first network routing domain.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 18 is a flow chart of a method of truncation of a network node from a network routing domain in accordance with some embodiments.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the present disclosure provide for management of network routing domains in communication networks, such as wireless Integrated-Access-Backhaul (IAB) networks. For example, a network node may determine to propagate a network routing domain of which the network node is a member to a peer node. In another example, a network node may determine to remove or truncate a peer node from a network routing domain. In various examples, the decisions to propagate or truncate the network routing domain may be made based on routing messages within a network routing domain, or in a plurality of overlapping network routing domains. In further examples, the decisions may be based on information about physical links between respective nodes.

Figure 1:
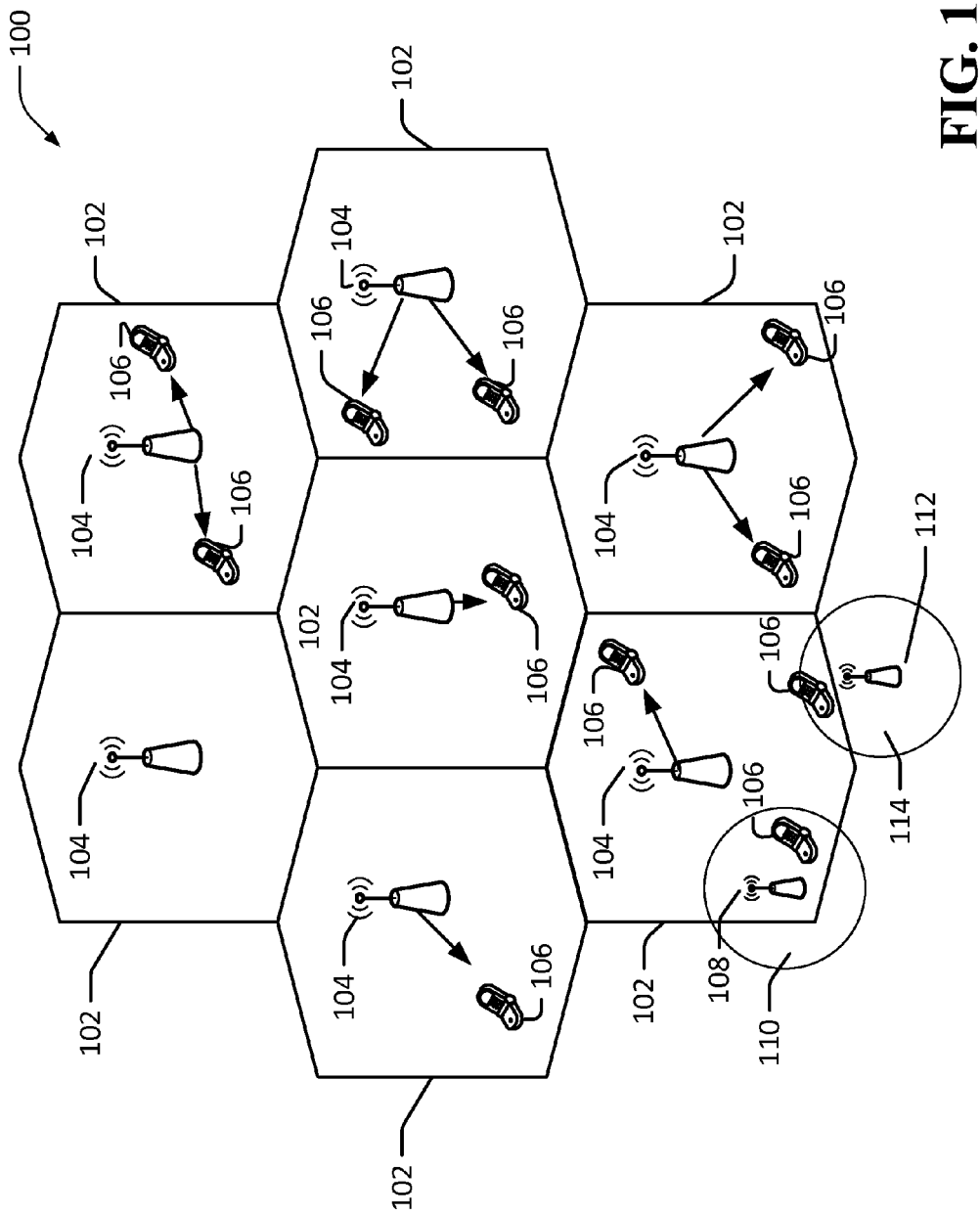
FIG. 1 is a conceptual diagram illustrating an example of an access network.

FIG. 1 is a diagram illustrating a generalized example of an access network 100 in a network architecture. In this example, the access network 100 is divided into a number of cellular regions (cells) 102, 110, 114. Each cellular region 102, 110, 114 includes a base station (BS) 104, 108, 112. One or more lower-power class BSs 108, 112 may have cellular regions 110, 114, respectively, that overlap with one or more other cellular regions (cells) 102. The cellular regions 110, 114 served by the lower power class BSs 108, 112 may be, for example, femto cells, pico cells, or micro cells.

Broadly, each base station (BS) 104, 108, 112 may be an evolved Node B (eNB), home eNB, access point or a user equipment (UE) 106 in a device-to-device and/or mesh network. One or more of the BSs 104, 108, 112 may also be referred to by those skilled in the art as a base station, a base transceiver station, a radio base station, a radio transceiver, a transceiver function, a basic service set (BSS), an extended service set (ESS), or some other suitable terminology. The BSs 104, 108, 112 provide access points to the network for one or more UEs 106. Examples of UEs 106 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 106 may also be referred to by those skilled in the art as a mobile node, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In some examples, the BSs 104, 108, 112 manage the resources on the carrier and assign resources to other users of the channel, such as one or more UEs 106 in the cellular network 100. In addition, the BSs 104, 108, 112 may be responsible for all radio related functions including radio bearer control, admission control, mobility control, scheduling, security, and connectivity to a centralized controller and/or gateway within a remote network, such as a mobile core network.

The modulation and multiple access scheme employed by the access network 100 may vary depending on the particular telecommunications standard being deployed. In Long Term Evolution (LTE) applications, OFDM is used on the downlink (DL) and SC-FDMA is used on the uplink (UL) to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

In some aspects of the disclosure, the access network 100 may overlap with a backhaul network, such as an Integrated-Access-Backhaul (IAB) network. That is, some or all of the BSs 104, 108, 112 may be IAB nodes 200 (see FIGS. 2-4) and may accordingly communicate with one another over the IAB network. However, this is merely one example, and aspects of the disclosure may be applied to other types of communication networks, and not limited to IAB or other types of backhaul networks.

Figure 2:
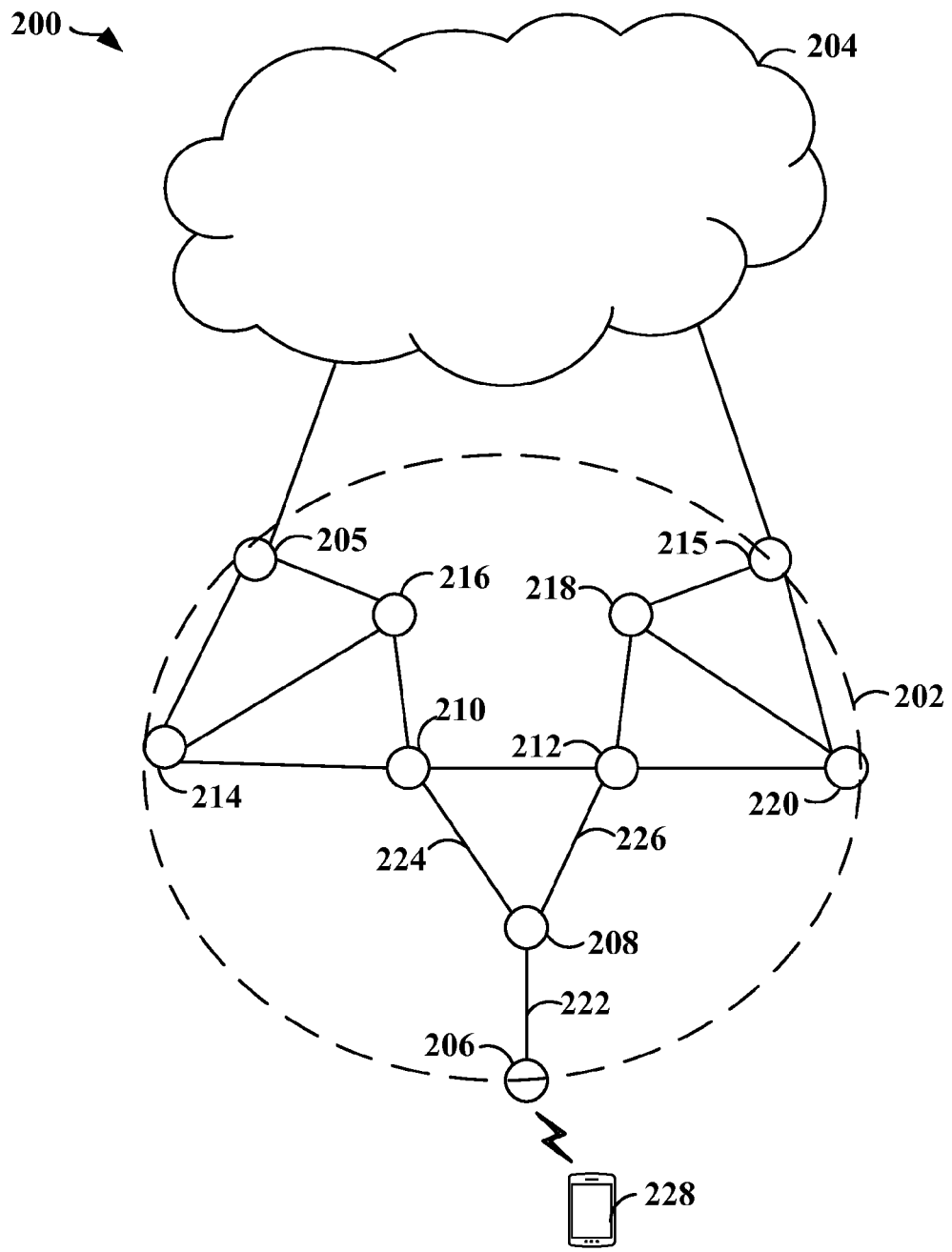
FIG. 2 is a schematic diagram providing a high-level illustration of one example of a network configuration according to some embodiments.

FIG. 2 is a schematic diagram providing a high-level illustration of one example of a network configuration 200 that may be utilized in some aspects of the disclosure. In this illustration, a communication network 202, such as a wireless network, is coupled to a remote network 204, such as a main backhaul network or mobile core network.

In some examples, the remote network 204 may correspond to a wireline backhaul network, such as a traditional T1 circuit switching network, a carrier Ethernet network, a hybrid of Ethernet and other Layer 2 technologies, such as Asynchronous Transfer Mode (ATM), T1-E1 and Frame Relay, an Internet Protocol (IP)/Ethernet network, or a flat Internet Protocol (IP) network. In addition, as described further below, the communication network 202 may correspond to an Integrated-Access-Backhaul (IAB) network. In such an IAB network, the wireless spectrum may be used for both access links and backhaul links.

In some examples, the communication network 202 and the remote network 204 are both Internet Protocol (IP) networks. In other examples, the communication network 202 is an IP network, while the remote network 204 is another type of network. Each network 202 and 204 typically supports a respective networking protocol, such as IP or IEEE 802.1 on the forwarding plane, and may also support a respective routing protocol on the control plane. A routing protocol specifies how network nodes (routers) disseminate information that enables them to select routes between any two nodes on a communication network. Each router generally has knowledge regarding network nodes attached directly to it. A routing protocol shares this information among peer nodes throughout the network. This way, routers gain knowledge of the topology of the network. Routing protocols may include, for example, a distance vector protocol, a link state protocol, or other routing protocol.

In the example shown in FIG. 2, the networks 202 and 204 are interconnected by a plurality of border nodes, including border node 205 and border node 215 as illustrated. These border nodes 205 and 215 generally provide network connectivity between the remote network 204 and the communication network 202. Furthermore, the communication network 202 is illustrated as supporting a plurality of network nodes 206, 208, 210, 212, 214, 216, 218, 220 which may be, for example, access points or base stations (BS) that may each have wireless access links with one or more user equipment (UE) 228. The network nodes and border nodes are interconnected via one or more physical links, e.g., links 222, 224, and 226. Each of the physical links 222, 224, 226 may be a wireless link or wireline link, as described further below.

In an aspect of the disclosure, each of the network nodes 206-220 is an IAB node, which may be an access point, base station (BS), eNB, or other node that utilizes wireless spectrum (e.g., the radio frequency (RF) spectrum) to support access for UEs and for the backhauling of access traffic. This may be referred to as wireless self-backhauling. Such wireless self-backhauling can enable fast and easy deployment of highly dense small cell networks. That is, rather than requiring each new BS deployment to be outfitted with its own hard-wired backhaul connection, the wireless spectrum utilized for communication between the BS and UE may be leveraged for backhaul communication between any numbers of IAB nodes, to form an IAB network 202.

For example, as shown in FIG. 2, access traffic may be backhauled between IAB node 206 and IAB node 208 via a wireless backhaul link 222, and between IAB node 208 and IAB node 210 via a wireless backhaul link 224. Some or all of the IAB nodes 206-220 may also be connected via wired backhaul links (e.g., fiber, coaxial cable, Ethernet, copper wires, etc.) and/or microwave backhaul links. Thus, the IAB network 202 may support both wired/microwave and wireless backhaul traffic. In an aspect, the physical air interfaces between respective IAB nodes and between IAB nodes and UEs may be IEEE 802.11 air interfaces. The border nodes 205 and 215 illustrated in FIG. 2 may also be IAB nodes. However, unlike other IAB nodes in the network 202, border nodes 205 and 215 also provide a communication link to the remote network 204. For example, a border node 205, 215 may include a wired (e.g., fiber, coaxial cable, Ethernet, copper wires), microwave, or other suitable link to the remote network 204.

The IAB network 202 may be addressed by a network address prefix (e.g., Prefix A), which it advertises to the remote network 204. To route packets to/from an IAB node 206, the IAB node 206 utilizes a network address, which includes the network address prefix. For example, the network address for IAB node 206 may be "A6." Thus, downstream packets for a UE 220 serviced by IAB node 206 would then carry "A6" as the destination address in the packet header.

Figure 3:
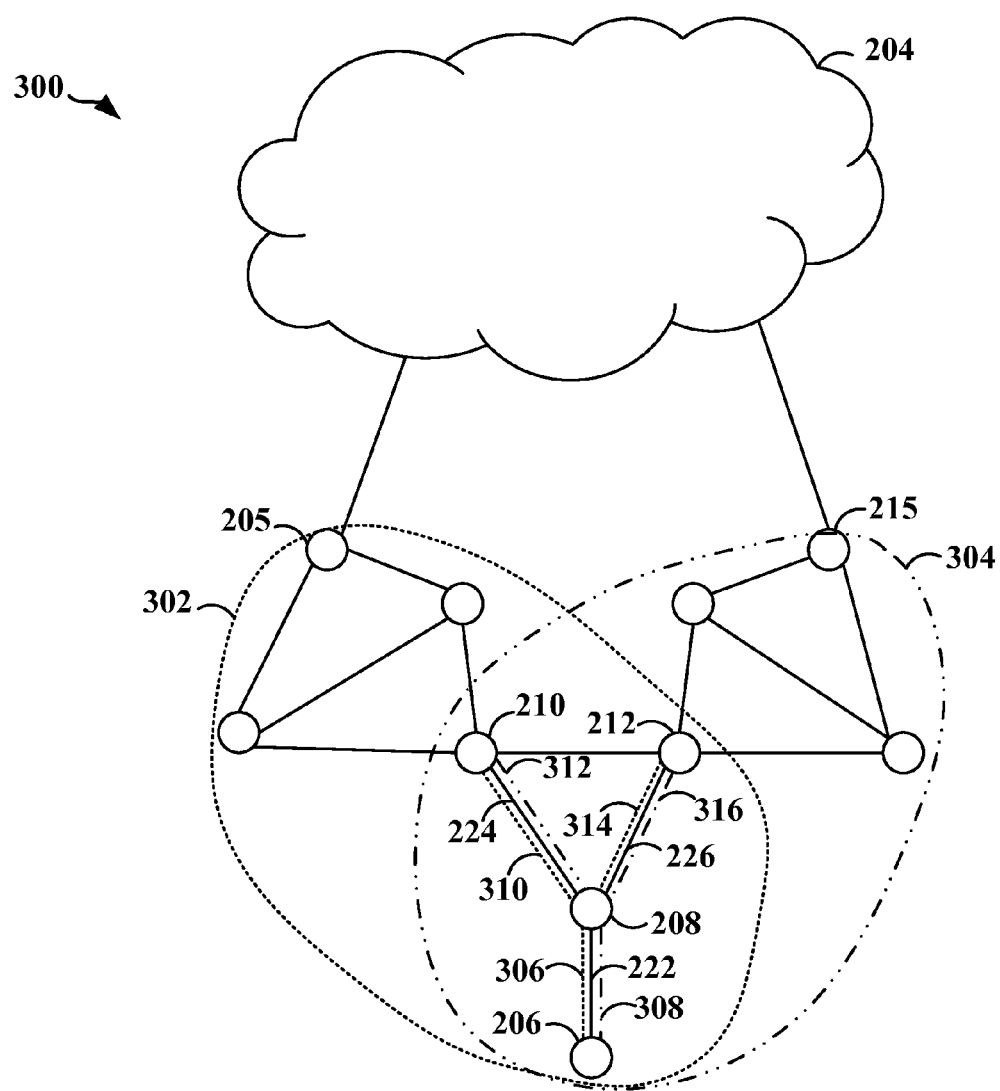
FIG. 3 is a schematic diagram illustrating additional details of the network configuration of FIG. 2 including overlapping network routing domains.

FIG. 3 illustrates a network configuration 300 in which the IAB network 202 is configured with two overlapping network routing domains, in accordance with some embodiments. However, there is no principle restriction to the number of network routing domains that may mutually overlap. The example shown in FIG. 3 illustrates an overlap of two routing domains merely for clarity purposes.

In the illustration of FIG. 3, the overlapping network routing domains include a first network routing domain 302 (denoted with the dashed line) and a second network routing domain 304 (denoted with the dash-dot line). Each network routing domain 302 and 304 is rooted at a different border node 205 and 215, respectively. In other examples, each network routing domain 302, 304 may be rooted at two or more border nodes.

Each network routing domain 302 and 304 may be addressed by a different network address prefix. For example, network routing domain 302 may be addressed by network address prefix "A," while network routing domain 304 may be addressed by network address prefix "B." Each border node 205 and 215 advertises their network address prefix to the remote network 204. Consequently, IAB nodes 206, 208, 210, and 212 residing in the overlap area between the network routing domains 302 and 304 obtain two network addresses, one for each network routing domain 302 and 304. For example, IAB node 206 may hold network address "A6" in network routing domain 302 and network address "B3" in network routing domain 304. In some examples, the network addresses are IP addresses.

To separate access traffic pertaining to the two network routing domains 302 and 304, each IAB node (e.g., IAB node 206) may create a separate logical interface coupled to a respective logical link for each of the network routing domains 302 and 304 (as described in more detail below in connection with FIG. 4). In general, each logical interface may be overlaid on a respective physical interface (i.e., a network interface card) that is coupled to a respective physical link (e.g., a wireless link, a microwave link, or a wired link, such as fiber, coaxial cable, Ethernet, copper wires and/or other wired communication link). In addition, each physical link may have one or more logical links overlaid thereon, each corresponding to one of the logical interfaces. In one example, each of the network routing domains 302 and 304 may be topologically different and independent routing networks that share physical (i.e., wireless or wired) links. As such, multiple logical links may be created and overlaid on each physical link to enable the physical links to be utilized at the logical level by more than one network routing domain.

In the illustrated example of FIG. 3, some of the physical links, such as physical link 222 between IAB node 206 and IAB node 208, are overlaid with two logical links 306 and 308, to implement the two network routing domains 302 and 304. Likewise, the physical link 224 between IAB node 208 and IAB node 210 is overlaid with logical links 310 and 312, with logical link 310 corresponding to network routing domain 302 and logical link 312 corresponding to network routing domain 304. In addition, the physical link 226 between IAB node 208 and IAB node 212 is overlaid with logical links 314 and 316, with logical link 314 corresponding to network routing domain 302 and logical link 316 corresponding to network routing domain 304

In an exemplary embodiment, the IAB nodes 206, 208, 210 and 212 may use local area network (LAN)-based forwarding on the backhaul and virtual local area network (VLAN) tags for differentiation of the network routing domains 302 and 304. In this manner, each physical link can support multiple logical links. In an aspect, each forwarding node (IAB node) represents a VLAN switch or bridge.

In another exemplary embodiment, the IAB nodes 206, 208, 210, 212 may use IP-based forwarding on the backhaul. For IP-based networks, a logical link, e.g., logical link 306, may be realized via a unique link identifier. This link identifier may be negotiated between both IAB nodes 206 and 208 during establishment of the logical link. The establishment of the logical link may be performed using signaling messages on the underlying physical link 222. The link identifier may be carried on the L2 header of packets pertaining to the logical link 306. In this manner, the receiving node of the packets can associate them with the corresponding logical link 306. In some examples, VLAN tags may be used as the unique link identifiers for differentiation of the network routing domains 302 and 304 and the logical links on top of each physical links. In an aspect, each forwarding node (IAB node) may represent an IP router.

While an extended overlap region of network routing domains 302 and 304 provides various benefits, such as redundancy, load balancing and enhanced connectivity to adjacent networks, the increased size of each network routing domain 302 and 304 may reduce the speed of routing-message propagation and routing-protocol convergence. Thus, the size and overlap of the network routing domains 302 and 304 may need to be optimized to provide sufficient redundancy, while allowing self-healing mechanisms to operate sufficiently fast. For example, the size and overlap of network routing domains may need to be dynamically adjusted with the integration of new network nodes, growth of traffic load or changes in the propagation environment or network topology. Various aspects of the present disclosure provide for the management of such overlapping network routing domains 302/304 in an autonomous manner.

According to various aspects of the present disclosure, it may be desired for an IAB node, such as IAB node 206, to be integrated into or removed from one or more network routing domains 302 and 304. The integration or removal may be implemented using a self-configuration algorithm that dynamically determines the extension or reduction of a network routing domain 302/304 and further dynamically adjusts the overlap regions of network routing domains 302 and 304 accordingly.

For example, IAB node 208 may determine that IAB node 206 should be integrated into or removed from one or more network routing domains 302 and/or 304. In another example, IAB node 206 may be physically connected to additional IAB nodes (not shown) that have been newly deployed in the communication network, and may decide to propagate one or more of the network routing domains 302 and/or 304 to the new IAB nodes. In yet another example, IAB node 206 may determine to remove itself from one or more network routing domains 302 and/or 304.

The criteria for inclusion/exclusion of a network node (IAB node) into/from a network routing domain 302/304 may be based on one or more metrics. In an aspect, one of these metrics may include a route metric conveying information related to a route between a network node and a network entity corresponding to the remote network 204 or to a destination node within either the remote network 204 or a particular network routing domain. Route metrics may be, for example, included in or derived from respective routing protocols that are run in each network routing domain 302 and 304. In the illustrated example shown in FIG. 3, IAB node 208 participates in one routing protocol instance with network routing domain 302 and in another network routing protocol instance with network routing domain 304. Therefore, IAB node 208 obtains information about the respective routes between IAB node 208 and the remote network 204 via each of these network routing domains 302/304.

In some examples, a route metric includes one or more path cost metrics that capture a measure related to a routing path between two network nodes, such as hop count, an aggregated latency along the routing path, average or minimum throughput along the links of the routing path, and/or a load or congestion on a bottleneck along the routing path. The routing path may refer to a selected physical path to the remote network 204, e.g., where the path cost is minimized or maximized. Path cost metrics may be directly provided explicitly in routing messages, such as, for instance, the information provided by a Distance-Vector Protocol. Path cost metrics may also be provided implicitly, e.g., where the routing messages, such as Link-State Routing protocol messages, provide a set of link-cost values of network nodes to their respective neighbor/peer nodes. For example, IAB node 208 may derive a path cost metric to remote network 204 from a set of link-cost values.

In another aspect, one or more of the metrics may include link metrics conveying information related to one or more physical links along a selected route between two network nodes and/or domain metrics conveying information related to a particular network routing domain 302/304. In some examples, a link metric may indicate a link quality of a physical link between a network node and a neighbor/peer node. For example, IAB node 208 may evaluate the performance of the physical links to neighbor domains, e.g. to IAB node 210 and IAB node 212, and include the obtained performance values (e.g., link-cost values) into the decision making process. The link performance may be obtained, for example, from measurements of link strength, signal-to-noise ratio (SNR) or signal interference to noise ratio (SINR) measurements, noise rise, interference, path loss, throughput estimate, load estimate, and/or latency estimate. Such link metrics may be derived from beacons, pilot signals or discovery signals received from peer IAB nodes.

In some examples, a domain metric may be related to a size of a particular network routing domain 302/304. For example, a domain metric may be derived from a hop count along a particular routing path to an adjacent network, such as remote network 204. In examples in which a Link-State Routing protocol is used for a network routing domain, a domain metric may also be derived from the aggregate number of nodes contained in a particular network routing domain 302/304.

In an aspect, the decision for network routing domain propagation or truncation may be performed on the IAB nodes themselves, where the routing messages arrive and the measurements are conducted. In this manner, the management of network routing domains is a distributed procedure. In other aspects, link, route and/or domain metrics may be forwarded to a centralized controller (not shown), which may derive aggregated path cost values, execute the decisions on network routing domain adjustments and communicate those decisions back to the IAB nodes. In further aspects, intermediate propagation/truncation evaluations may be made locally on an IAB node, which then reports the intermediate results to the centralized controller for further processing and final determination of the network routing domain decisions. The centralized controller may make the intermediate evaluations and forward the intermediate results to one or more IAB nodes for further processing.

Figure 4:
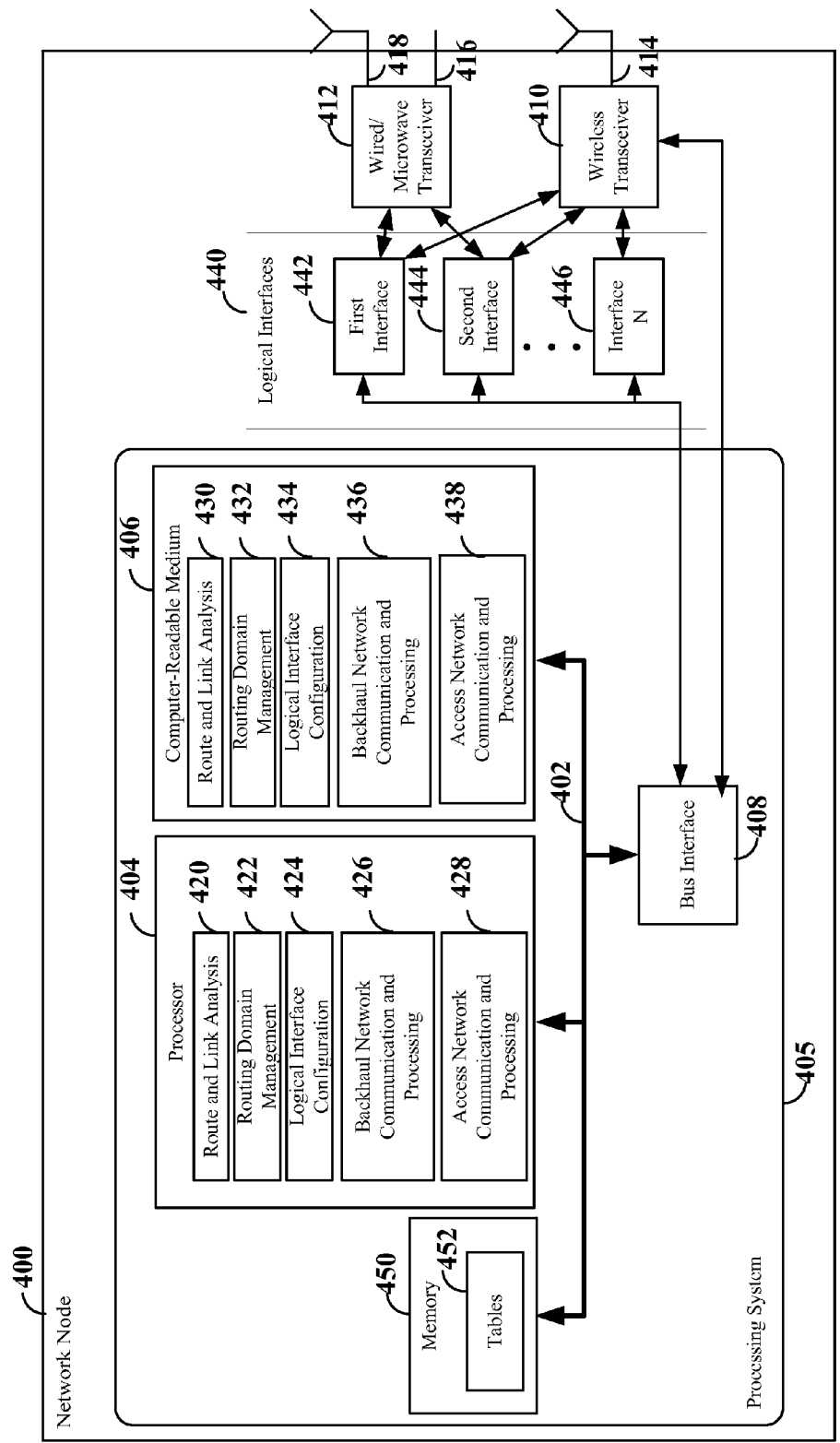
FIG. 4 is a block diagram conceptually illustrating an example of a network node according to some embodiments.

FIG. 4 is a conceptual diagram illustrating an example of a hardware implementation for a network node 400 employing a processing system 405. In accordance with various aspects of the disclosure, an element, or any portion of an element, or any combination of elements may be implemented with a processing system 405 that includes one or more processors 404.

In various aspects of the disclosure, the network node 400 may correspond to a base station in a wireless communication network, such as an IAB network, having a wireless transceiver 410 configured for communicating with one or more user equipment (UE) or other entities in the wireless communication network. Here, the wireless transceiver 410 may further be configured for wireless communication with one or more other base stations or IAB nodes over a wireless backhaul network. In some examples, the wireless transceiver 810 may include circuitry for transmitting and receiving via more than wireless communication protocol, such as circuitry for communicating according to two or more of Long Term Evolution (LTE) (in FDD, TDD, or both modes), LTE-Advanced (LTE-A) (in FDD, TDD, or both modes), CDMA2000, Evolution-Data Optimized (EV-DO), IEEE 802.11 (Wi-Fi), IEEE 802.16 (WiMAX), IEEE 802.20, Bluetooth, and/or other suitable wireless communication protocol. In a further aspect, the network node 400 may optionally include a wired and/or microwave transceiver 412 for communication with one or more other base stations or IAB nodes, a main backhaul network or other remote network, such as a mobile core network. For example, the network node 400 may correspond to a border node.

Each transceiver 410 and 412 provides a means for communicating with various other apparatus over a respective transmission medium or physical link. For example, the wireless transceiver 410 may be coupled to one or more antennas (generally represented by antenna 414) to provide communication over a wireless communication link with one or more UEs or base stations. The wired/microwave transceiver 414 may be coupled to one or more wired links (represented generally by link 416) to provide wired communication with one or more base stations or the main backhaul network. Examples of wired links include, but are not limited to, fiber, coaxial cable, Ethernet, copper wires and/or other wired communication link. The wired/microwave transceiver 414 may also be coupled to one or more microwave antennas (represented generally by antenna 418) to provide communication over a wireless microwave link with one or more base stations or the main backhaul network.

Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 404, as utilized in a network node 400, may be used to implement any one or more of the processes described below.

In this example, the processing system 405 may be implemented with a bus architecture, represented generally by the bus 402. The bus 402 may include any number of interconnecting buses and bridges depending on the specific application of the processing system 405 and the overall design constraints. The bus 402 links together various circuits including one or more processors (represented generally by the processor 404), a memory 450, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and the transceivers 410 and 412.

The processor 404 is responsible for managing the bus 402 and general processing, including the execution of software stored on the computer-readable medium 406. The software, when executed by the processor 404, causes the processing system 405 to perform the various functions described below. The computer-readable medium 406 may also be used for storing data that is manipulated by the processor 404 when executing software.

In some aspects of the disclosure, the processor 404 may include route and link analysis circuitry 420, configured to receive periodic and/or event-driven routing messages related to one or more routes and/or links. The routing messages may include, for example, link state messages and/or distance-vector messages received on one or more physical or logical interfaces corresponding to one or more physical or logical links. From the routing messages, the route and link analysis circuitry 420 may identify or derive route, link and/or domain metrics. Domain metrics may convey information related to a particular network routing domain, such as a size of the particular network routing domain, link metrics may convey information pertaining to each physical link coupled to the network node, and route metrics may convey information pertaining to one or more routes to/from the network node within the communication network. The routes may each have a common destination network, such as the core network or the main backhaul network. Each route may also have a different destination node, such as a border node of a particular network routing domain or a node within a remote network. The routes may also refer to default routes provided by each network routing domain.

Examples of link metrics include, but are not limited to, signal strength, signal-to-noise ratio (SNR) or signal interference to noise ratio (SINR) measurements, noise rise, interference, path loss, throughput estimate, load estimate, and/or latency estimate. Examples of route metrics include, but are not limited to, the hop count, the minimum throughput value along the route, aggregate route latency, a bottleneck load value along the route, and/or other aggregated link metrics. Examples of domain metrics may include, but are not limited to, a hop count along a particular routing path to an adjacent network and/or an aggregated number of network nodes within a network routing domain. The route and link analysis circuitry 420 may operate in coordination with route and link analysis software 430.

The processor 404 may further include routing domain management circuitry 422, configured to manage propagation and/or truncation of one or more network nodes to/from one or more network routing domains based on the metrics determined by the route and link analysis circuitry 420. In various aspects of the disclosure, the routing domain management circuitry 422 may determine that a neighbor/peer node having physical connectivity to the network node 400 should be integrated into or removed from one or more network routing domains. In other aspects, the routing domain management circuitry 422 may determine to remove the network node 400 itself from one or more network routing domains of which it is currently a member.

In an aspect, the routing domain management circuitry 422 may obtain first information (e.g., a path cost metric) for a first route from the network node 400 via a first network routing domain to a remote network, such as a main backhaul network or mobile core network, and second information (e.g., a link metric) for a second route from the network node 400 to a peer node that is outside of the first network routing domain. From the first and second information, the routing domain management circuitry 422 may derive an aggregate value (e.g., aggregate path cost metric) between the peer node and the remote network via the first network routing domain. The routing domain management circuitry 422 may then compare the aggregate path cost metric with a first path cost threshold (e.g., $T_{add}$). If the aggregate path cost metric compares favorably with $T_{add}$, the routing domain management circuitry 422 may determine to propagate the first network routing domain to the peer node. In some examples, the aggregate path cost metric provides a measure of the availability of a particular routing path. Here, a low aggregate path cost metric value indicates a high availability of the routing path and a high aggregate path cost metric value indicates a low availability of the routing path. In this example, if the aggregate path cost metric is less than $T_{add}$, the routing domain management circuitry 422 may determine to propagate the first network routing domain to the peer node.

In other aspects, the routing domain management circuitry 422 may obtain a first aggregate path cost metric, as described above, for a first route between the peer node and the remote network via the first network routing domain and a second aggregate path cost metric for a second route between the peer node and the remote network via a second network routing domain. In some examples, the routing domain management circuitry 422 may then compare each aggregate path cost metric with $T_{add}$ and determine to propagate both the first network routing domain and the second network routing domain to the peer node if each aggregate path cost metric compares favorably with $T_{add}$. In other examples, the routing domain management circuitry 422 may rank the aggregate path cost metric values and select the network routing domain with the lowest aggregate path cost metric value to propagate to the peer node. The rankings may also be used in connection with the threshold $T_{add}$. This process may be extended to any number of network routing domains to enable the routing domain management circuitry 422 to select one, all or a subset of the network routing domains to be propagated to the peer node. This process may further be extended to any number of peer nodes.

In another aspect, the routing domain management circuitry 422 may further determine whether to remove a peer node from a network routing domain by ranking and selecting the network routing domain with the highest aggregate path cost metric for removal or comparing the aggregate path cost metric with a second path cost threshold (e.g., $T_{drop}$). For example, if the aggregate path cost metric compares unfavorably with $T_{drop}$ (e.g., the aggregate path cost metric is greater than $T_{drop}$), the routing domain management circuitry 422 may determine to remove the peer node from the first network routing domain. In an aspect, a hysteresis parameter may be used together with $T_{drop}$ to avoid ping-pong effects of adding/removing nodes to/from network routing domains. In some examples, the path cost threshold values may be predetermined and stored in, for example, memory 450. In other examples, the path cost threshold values may be dynamically set based on various factors, such as current loading across the network routing domains, number of nodes in each network routing domain, link failures in the communication network, number of network routing domains in the communication network, and other factors.

In another aspect, the routing domain management circuitry 422 may determine whether to remove the network node 400 itself from one or more network routing domains. For example, the routing domain management circuitry 422 may directly evaluate the aggregate path cost metric from the network node 400 to the remote network and compare the aggregate path cost metric with $T_{drop}$. As another example, the routing domain management circuitry 422 may evaluate the respective aggregate path cost metrics from the network node 400 to the remote network via two or more network routing domains and select one or more of the network routing domains for removal by ranking and/or comparison with $T_{drop}$.

The routing domain management circuitry 422 may further exchange the route/link information (e.g., route and link metrics) obtained during the propagation process with the peer node once the peer node has been added to one or more network routing domains. The routing domain management circuitry 422 may further operate in coordination with routing domain management software 432.

The processor 404 may further include logical interface configuration circuitry 424, configured to establish one or more logical interfaces 440 for each network routing domain. For example, a first logical interface 442 may be created for a first network routing domain, a second logical interface 444 may be created for the first or a second network routing domain, and so on until the $N^{th}$ logical interface 446 is created for a network routing domain up to the $N^{th}$ network routing domain. Each logical interface 440 is virtually overlaid on a respective physical interface (i.e., network interface card) coupled to a respective physical link to enable each physical link to be utilized at the logical layer by more than one network routing domain. For example, the first logical interface 442 may be created for a first network routing domain for access traffic between the network node 400 and the remote network. The first logical interface 442 may be overlaid, for example, on a wireless interface so that all traffic flows pertaining to the first network routing domain and destined for the remote network are forwarded to the wireless transceiver 410 for transmission over a respective logical link overlaid on the wireless communication link. In another example, the second logical interface 444 may be created for a second network routing domain for access traffic between the network node 400 and the remote network. The second logical interface may be overlaid on a wired/microwave interface so that all traffic flows pertaining to the second network routing domain are forwarded to the wired/microwave transceiver 412 for transmission over a wired link 416.

The logical interface configuration circuitry 424 further operates in coordination with the routing domain management circuitry 422 to propagate/truncate network routing domains to/from one or more peer nodes. For example, to propagate a network routing domain to a peer node, the logical interface configuration circuitry 424 may transmit a request to establish the logical link to the peer node, and upon receiving a response indicating the logical link should be established from the peer node, create a logical interface 440 for the logical link to the peer node. The logical interface 440 may then be mapped to a physical interface between the network node and the peer node. For example, the $N^{th}$ logical interface 446 may be created to propagate the first network routing domain to the peer node, so that access traffic to/from the peer node may be forwarded to/received from the peer node via the Nth logical interface 446. The Nth logical interface 446 may be overlaid on, for example, a wireless interface so that all traffic flows pertaining to the peer node are forwarded to/received from the wireless transceiver 410 (e.g., for transmission/reception over a respective logical link to the peer node overlaid on the wireless communication link).

The mapping of network routing domains to logical interfaces 440 may be maintained in one or more tables 452 within, for example, memory 450. The tables 452 may further map each logical interface 450 to a respective physical link (physical interface). Thus, the logical interface configuration circuitry 424 may operate in coordination with the routing domain management circuitry 422 to populate the tables 452 with the logical interfaces, network routing domains and corresponding physical links.

For logical interfaces corresponding to logical links terminating at the network node 400, the logical interface configuration circuitry 424 may further assign a network address, such as an IP address, to each logical interface 440. The network address includes the network address prefix for the network routing domain associated with the logical interface 440. For logical interfaces corresponding to logical links terminating at a downstream peer node, the logical interface configuration circuitry may further determine the network address of the peer node for the network routing domain associated with the logical interface 440. The tables 452 may further map network addresses to logical interfaces 440. If a logical interface 440 is used to route traffic to/from multiple downstream peer nodes, the network addresses of each downstream peer node may be mapped to the corresponding logical interface 440 in the tables 452.

Thus, when propagating a network routing domain to a peer node, the logical interface configuration circuitry 424 may create a logical interface 440 for routing traffic to/from the peer node via the network routing domain and update the tables 452 with the logical interface 440 for the peer node, the network routing domain associated with the logical interface, the network address of the peer node for the network routing domain, the physical interface (wireless or wired) on which the logical interface 440 is overlaid and any traffic flow tunnel information associated with traffic flows to/from the peer node. Similarly, when a network routing domain has been propagated to the network node 400, the logical interface configuration circuitry 424 may create a logical interface 440 for routing traffic via the network routing domain and update the tables 452 with the logical interface, the network address of the network node 400 for the network routing domain, the physical interface (wireless or wired) on which the logical interface 440 is overlaid and any traffic flow tunnel information associated with traffic flows sent on the logical interface.

To remove a peer node or the network node 400 itself from a network routing domain, the logical interface configuration circuitry 424 may tear down the logical link associated with the network routing domain by deleting the logical interface created for the network routing domain and updating the tables 452 to remove the network address for the network routing domain, and any mapping between the logical interface, the network address, the physical link and any traffic flow tunnel information associated with the logical interface.

Each logical interface 440 may be implemented, for example, in software. In some examples, the logical interfaces 440 are embodied in the computer-readable medium 406. In other examples, the logical interfaces 440 may reside in a computer-readable medium external to the processing system 405 or distributed across multiple computer-readable media. In various aspects of the disclosure, each logical interface 440 is represented as a software object to which IP address configuration is bound. Thus, from the perspective of the IP stack and its applications, a logical interface appears as a physical interface. However, the transmit/receive functions of the logical interface are mapped to the transmit/receive operations of the physical interface to which the logical interface is tied. The logical interface configuration circuitry 424 may statically create and configure one or more of the logical interfaces 440 or may dynamically create and configure one or more of the logical interfaces 440. The logical interface configuration circuitry may further operate in coordination with logical interface configuration software 434.

The processor 404 may further include backhaul network communication and processing circuitry 426, configured for transmitting and receiving access traffic flows to and from a backhaul network, such as an IAB network. For example, the backhaul network communication and processing circuitry 426 may identify a respective logical interface 440 for each traffic flow and provide the access traffic for each traffic flow to the respective logical interface 440 for transmission through the backhaul network. The backhaul network communication and processing circuitry 426 may further receive traffic flows from the backhaul network via one or more logical interfaces 440 and forward traffic flows to the appropriate peer node via one or more logical interfaces 440. The backhaul network communication and processing circuitry may further operate in coordination with backhaul network communication and processing software 436.

The processor 404 may further include access network communication and processing circuitry 428, configured for transmitting and receiving access traffic flows to and from one or more UEs via wireless transceiver 410. For example, the access network communication and processing circuitry may receive access traffic from one or more UEs and provide the received access traffic to the backhaul network communication and processing circuitry 426 for forwarding of the access traffic to the core network via the backhaul network. The access network communication and processing circuitry 428 may further receive access traffic for one or more UEs from the backhaul network communication and processing circuitry 426 and transmit the access traffic to the respective UEs via the wireless transceiver 410.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 405, external to the processing system 405, or distributed across multiple entities including the processing system 405. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

FIGS. 5-9 are schematic diagrams illustrating a sequence of operations for propagating a network routing domain in accordance with some embodiments. As indicated above, some aspects of this disclosure provide for an automatic/dynamic algorithm or procedure for propagating a network routing domain to extend over, or include, a peer node. In each of FIGS. 5-9, it may be assumed that the physical links between network nodes already exist, as illustrated in FIGS. 2 and 3. However, the physical link between network nodes 210 and 212 has been omitted for ease of illustration.

Figure 5:
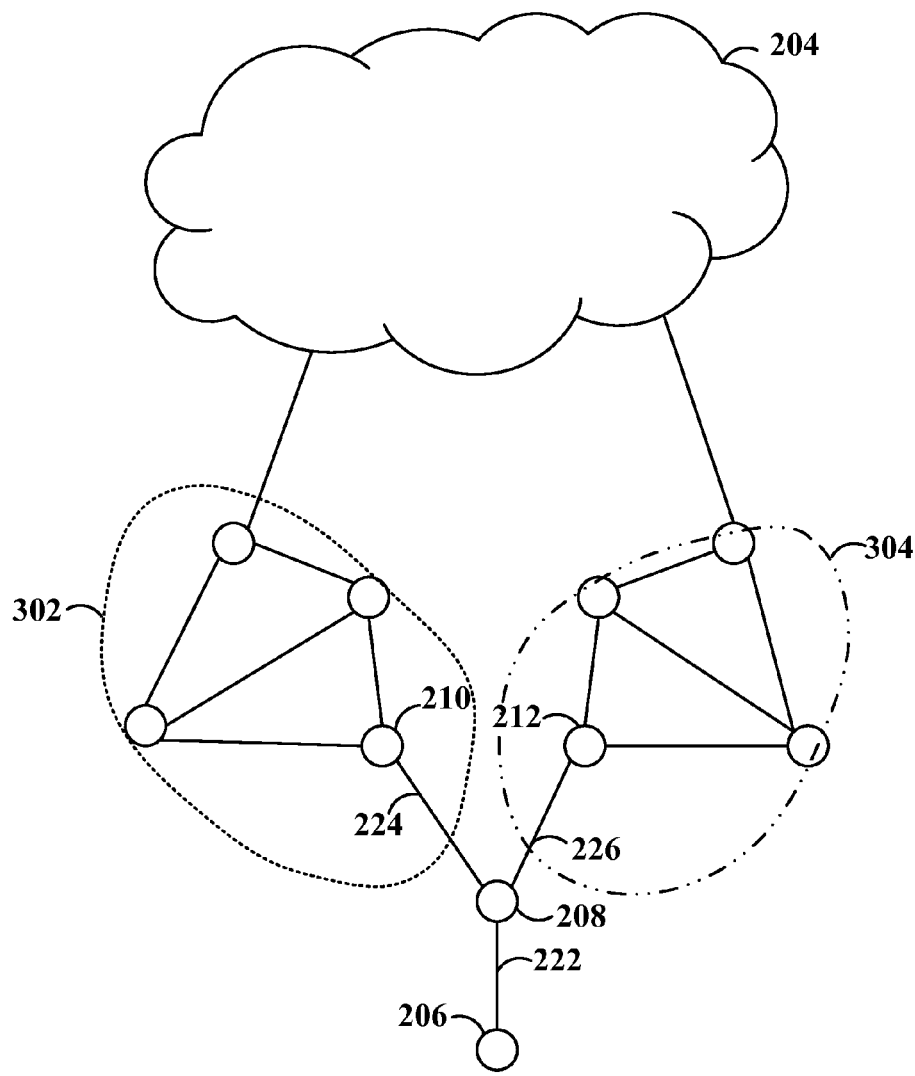
FIGS. 5-9 are schematic diagrams illustrating a sequence of operations for propagating a network routing domain in accordance with some embodiments.

Referring now to FIG. 5, two network routing domains, including a first network routing domain 302 and a second network routing domain 304 are illustrated. As seen in this illustration, it may be the case that not all network nodes (i.e., node 206 and node 208) belong to either network routing domain 302/304. Further, as illustrated in FIG. 5, there may be no overlap between the network routing domains 302/304. Since network node 206 and network node 208, which may each correspond to an IAB node, as described above, do have physical layer connectivity with other nodes in the network, it may be desirable to assign network node 206 and/or network node 208 to one or both of these network routing domains 302 and 304. To add either network node 206 or network node 208 to one or more of the network routing domains 302 and 304, there may be one or more criteria to consider whether the network nodes should be added.

For example, consider network node 208. This node may be best assigned to network routing domain 302, or best assigned to network routing domain 304. In some examples, it may be best to assign network node 208 to both network routing domains 302 and 304. This decision may depend on a variety of factors, such as the connectivity to the remote network 204, the instantaneous loading on the network routing domains 302 and 304, potential bottlenecks on the network routing domains 302 and 304, latency on the network routing domains 302 and 304, the size of the network routing domains 302 and 304, or other suitable criteria, parameters, or factors. Regarding the size of the domain, it is generally the case that the larger a network routing domain is, the slower it becomes for routing protocols to actually converge, and the more signaling traffic is created for the routing protocol. Since each network node regularly transmits routing information on its neighborhood, this can create a large overhead in signaling and cause extensive processing at each of the network nodes. If changes in connectivity occur on the network, such changes are measured and corresponding information is transmitted around the network routing domain, until the network routing domain converges.

Figure 6:
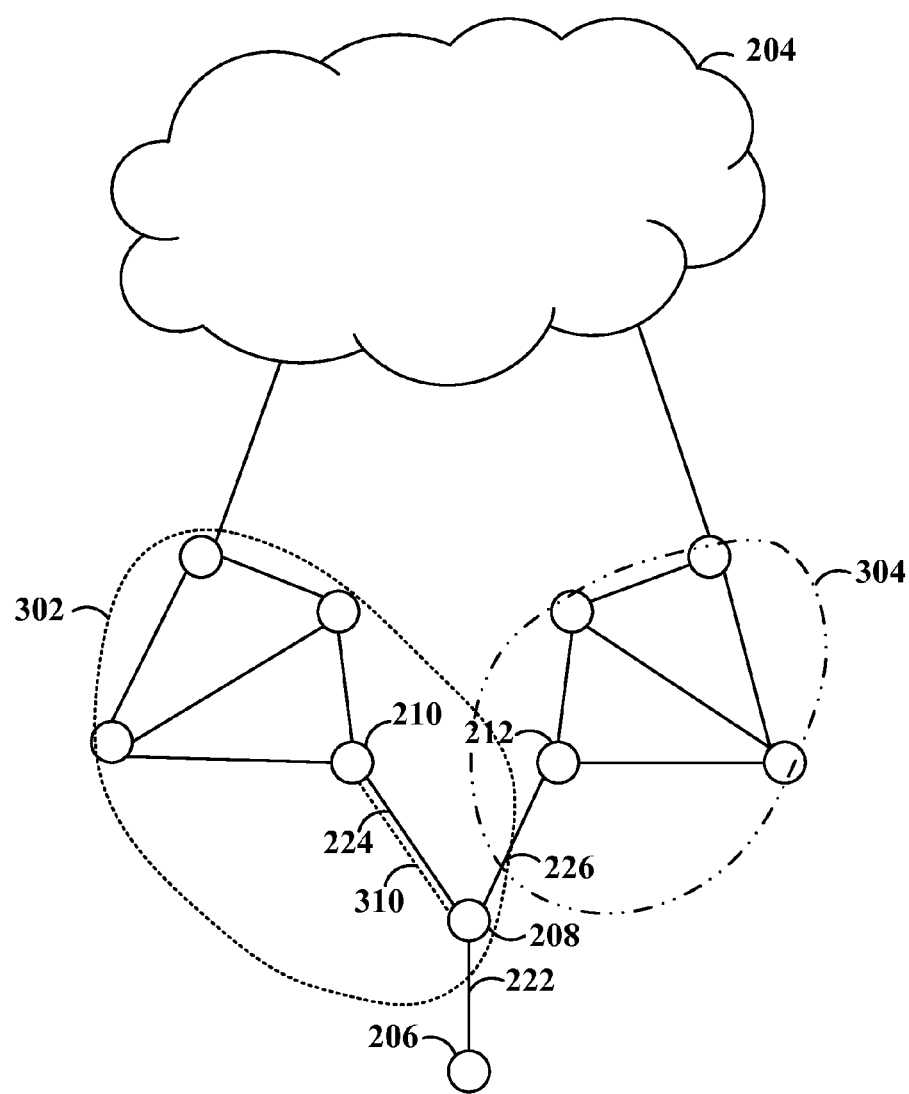

Referring now to FIG. 6, it can be seen that network node 208 has been integrated into network routing domain 302. That is, network routing domain 302 has expanded to encompass network node 208 utilizing one or more aspects of the present disclosure to create logical link 310 between network node 210 and network node 208. In this illustrated example, the decision to propagate the network routing domain 302 may be made by network node 210, which is the node within the network routing domain 302 that has a direct physical link 224 with the node to be added, network node 208.

Figure 7:
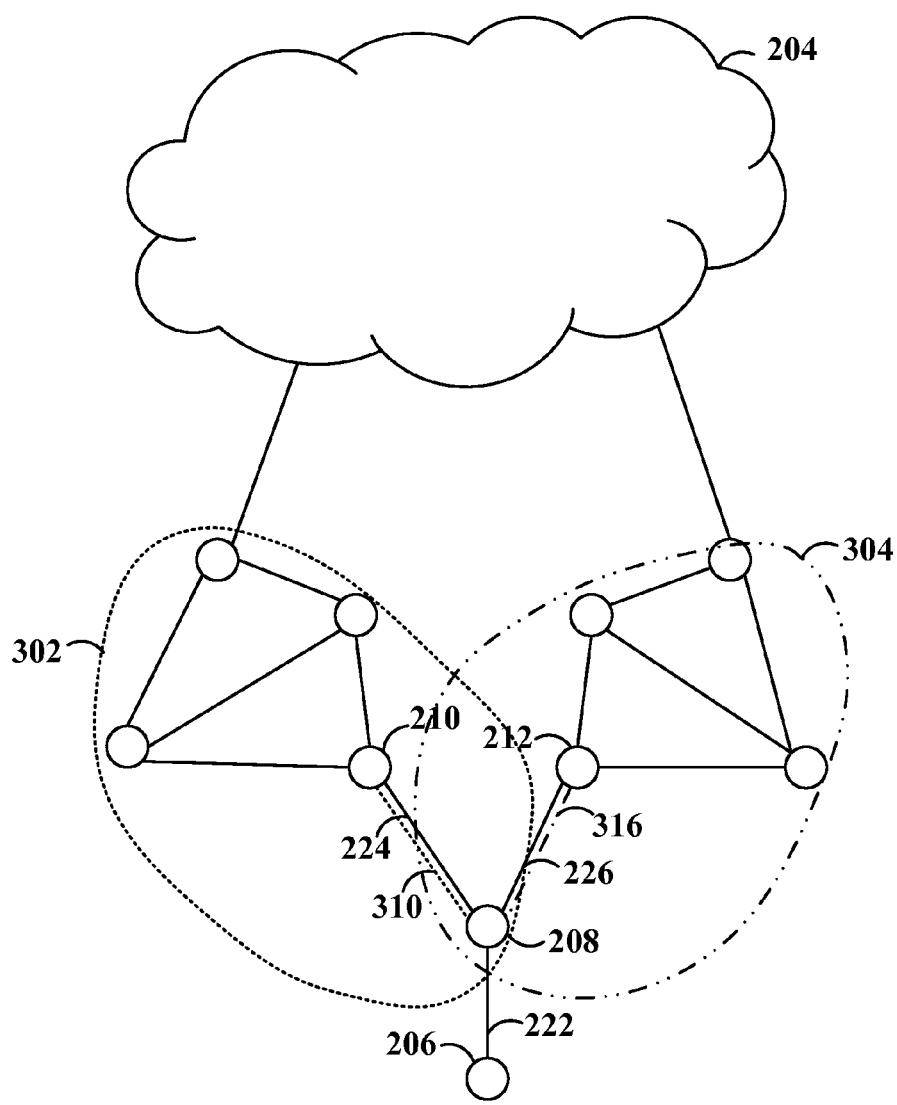

Referring to FIG. 7, it can be seen that network node 208 has been further integrated into network routing domain 304. That is, network routing domain 304 has expanded to encompass network node 208 utilizing one or more aspects of the present disclosure to create logical link 316 between network node 212 and network node 208. In this illustrated example, the decision to propagate the network routing domain 304 may be made by network node 212, which is the node within the network routing domain 304 that has a direct physical link 226 with the node to be added, network node 208.

At this point, the two network routing domains 302/304 begin to overlap, in that both network routing domains 302/304 include network node 208. Accordingly, network node 208 has redundancy, providing for more robust routing in the case that one of the networks routing domains 302/304 in which network node 208 resides loses connectivity to the remote network 204. Further, this redundancy provides for load balancing between the respective network routing domains 302/304. However, at this point, each physical link 224, 226 continues only to include a single respective logical link 310, 316.

Figure 8:
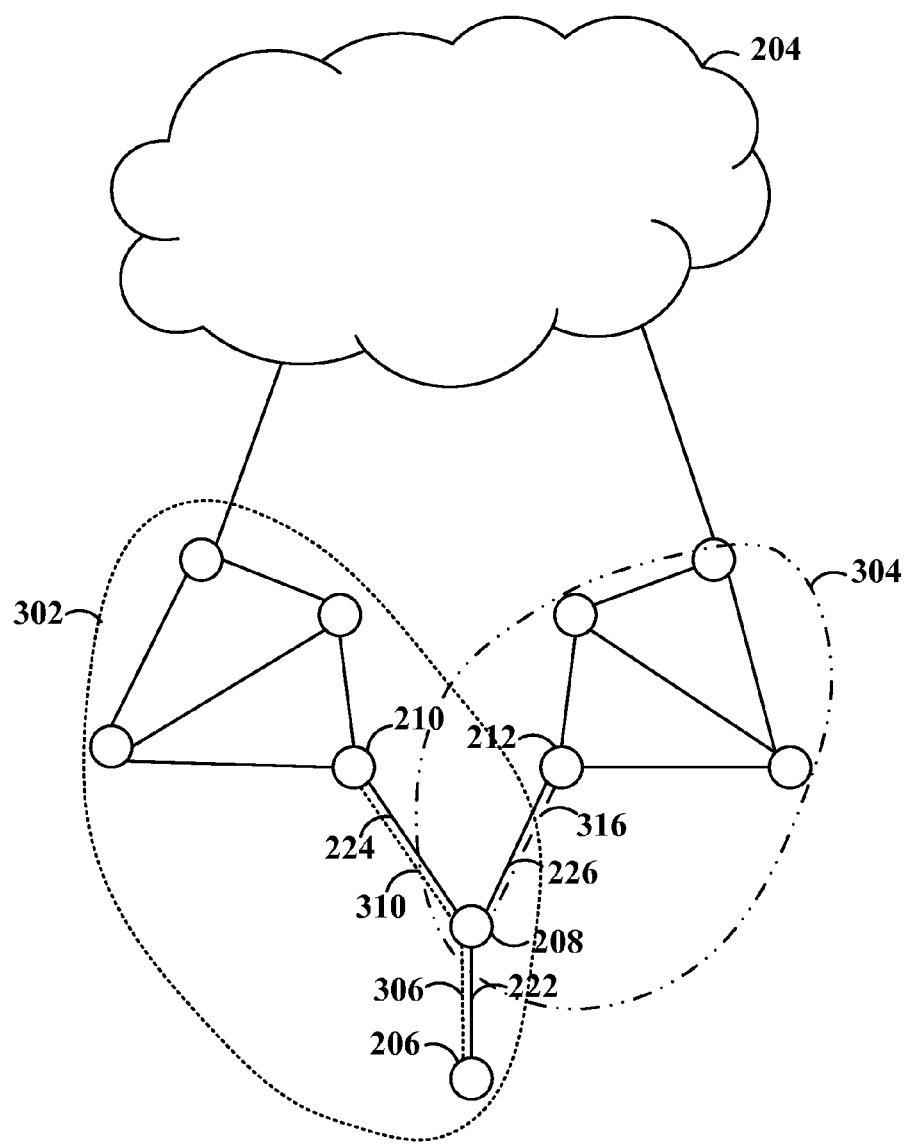

Referring to FIG. 8, it can be seen that network node 206 has been integrated into network routing domain 302. That is, network routing domain 302 has expanded to encompass network node 206 utilizing one or more aspects of the present disclosure to create logical link 306 between network node 208 and network node 206. In this illustrated example, the decision to propagate the network routing domain 302 may be made by network node 208, which is the node within the network routing domain 302 that has a direct physical link 222 with the node to be added, network node 206.

Figure 9:
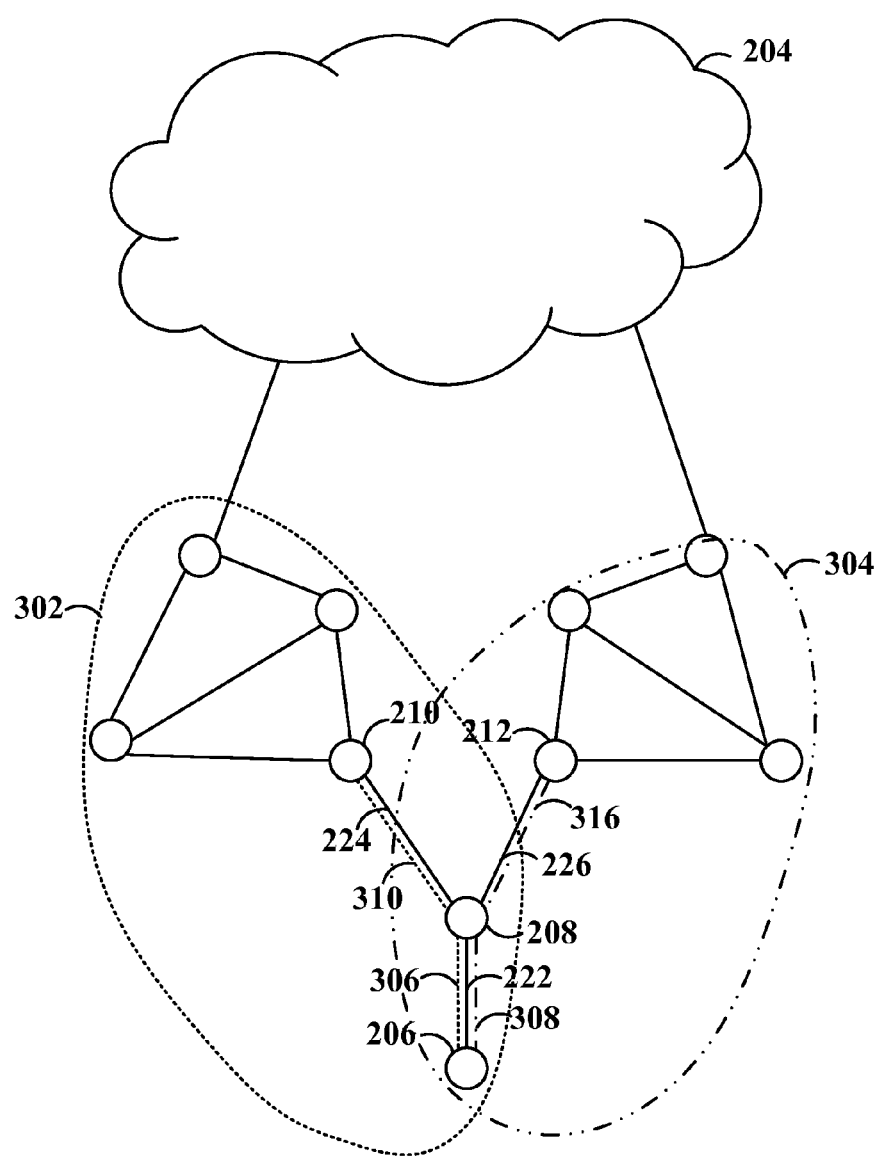

Referring to FIG. 9, it can be seen network node 206 has been integrated into network routing domain 304. That is, network routing domain 304 has expanded to encompass network node 206 utilizing one or more aspects of the present disclosure to create logical link 308 between network node 208 and network node 206. In this illustrated example, the decision to propagate the network routing domain 304 may be made by network node 208, which is the node within the network routing domain 304 that has a direct physical link 222 with the node to be added, network node 206.

At this point, the physical link 222 between network node 206 and network node 208 includes two logical links 306 and 308: one corresponding to network routing domain 302 and the other corresponding to network routing domain 308. Within the scope of the present disclosure, any number of logical links may correspond to a single physical link.

In FIG. 9, network nodes 206 and 208 each have redundant connectivity to two network routing domains 302/304, and enjoy the benefits and advantages such connectivity provides. In this example, there remain a number of nodes in each of the network routing domains 302/304 which remain only within their respective network routing domain. In some examples, all nodes may be integrated into both network routing domains, so all network nodes enjoy the redundancy described above. However, in other examples, due to certain disadvantages (described above) that may arise when a network routing domain continues to increase in size, it may be decided to maintain some nodes only within a single network routing domain.

Figure 10:
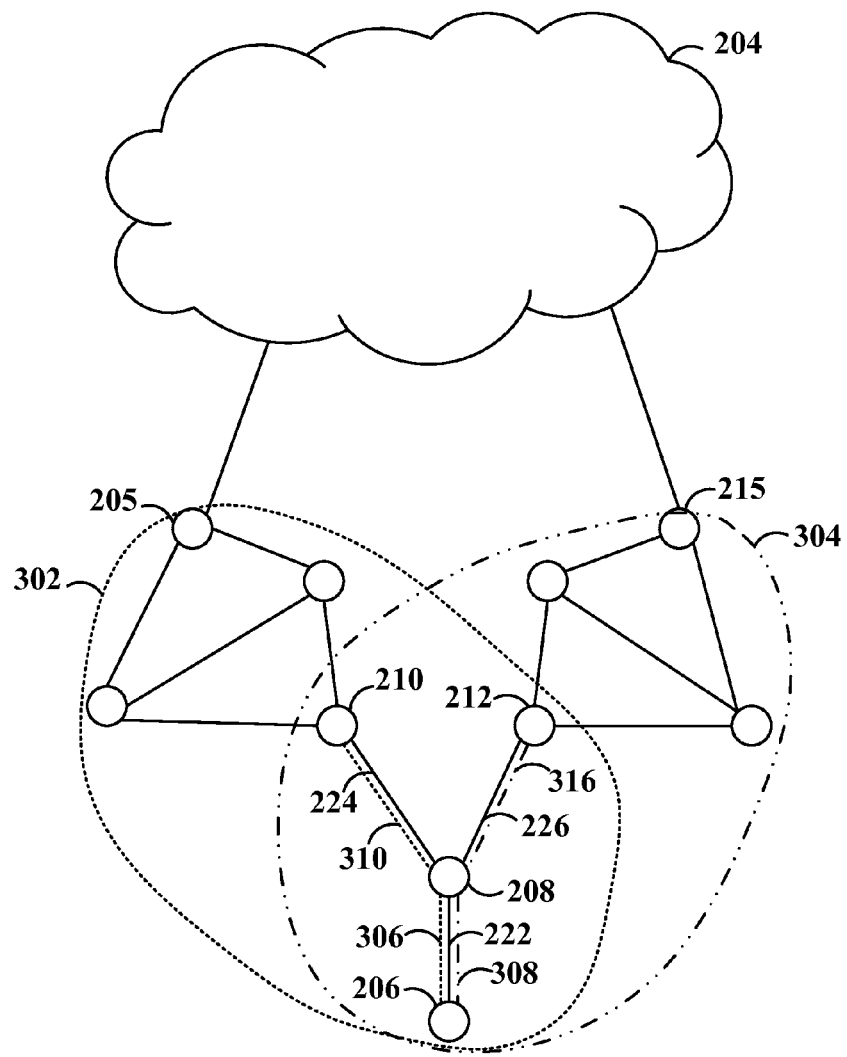
FIGS. 10-11 are schematic diagrams illustrating a sequence of operations for truncation or removal of a network node from a network routing domain in accordance with some embodiments.
Figure 11:
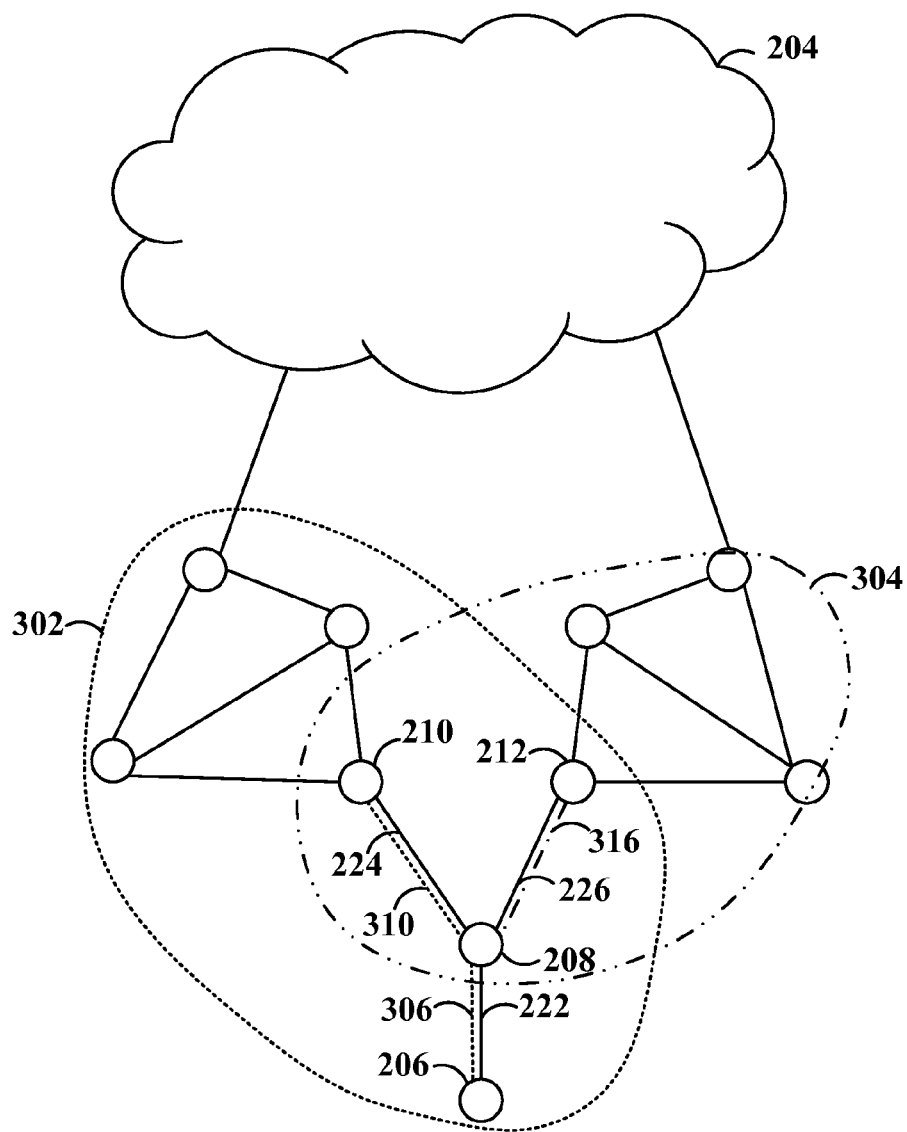

While the above sequence shows operations for propagating a network routing domain to add additional nodes, FIGS. 10-11 illustrate one example of truncation or removal of a node from a network routing domain in accordance with some embodiments. Truncating nodes to 'shrink' a network routing domain may be desired for any of a number of reasons. For example, a network routing domain may become overloaded (e.g., the traffic communicated on one or more physical links within a network routing domain may exceed a threshold), so eliminating one or more network nodes, and accordingly eliminating their associated overhead from updates and other messages according to the routing protocol, may be desired.

Referring to FIG. 10, two network routing domains 302 and 304 are again illustrated. Here, these two network routing domains overlap such that both domains include network nodes 206, 208, 210, and 212, which may each correspond to an IAB node, as described above. In addition, as in FIGS. 5-9, there is no physical link between network nodes 210 and 212 for ease of illustration. At FIG. 11, it is seen that network node 206 has been truncated from network routing domain 304, by virtue of the elimination of the logical link 308 between network node 206 and network node 208.

Figure 12:
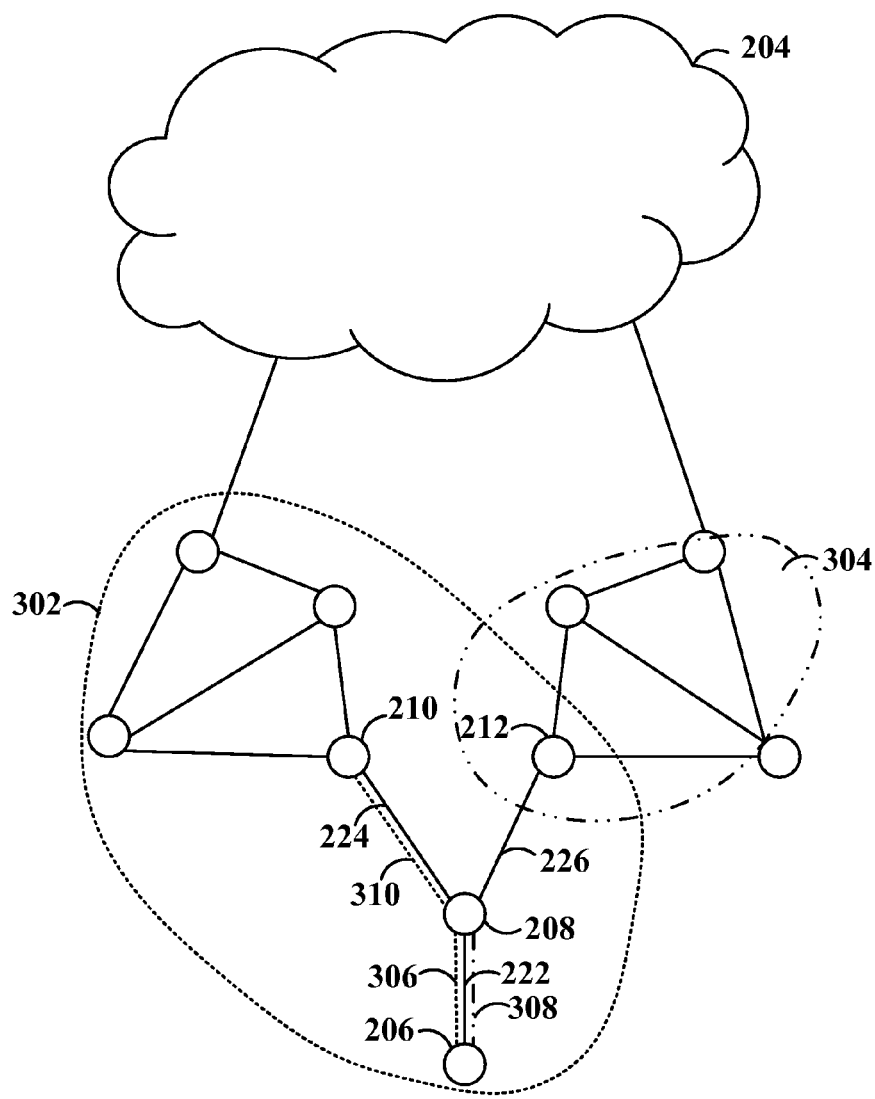
FIG. 12 is a schematic diagram illustrating truncation or removal of a network node from a network routing domain in accordance with some embodiments.

FIG. 12 illustrates another example of truncation of a network node from a network routing domain. In FIG. 12, it is seen that network node 208 has been removed from network routing domain 304 by network node 212. As a consequence, network nodes 206 and 208 are unable to reach remote network 204 via network routing domain 304. Network node 208 observes the discontinuation of the connection to the remote network 204 via network routing domain 304 when its logical link 316 is torn down (removed). Network node 208 may then remove network node 206 from network routing domain 304 by tearing down logical link 308.

Figure 13:
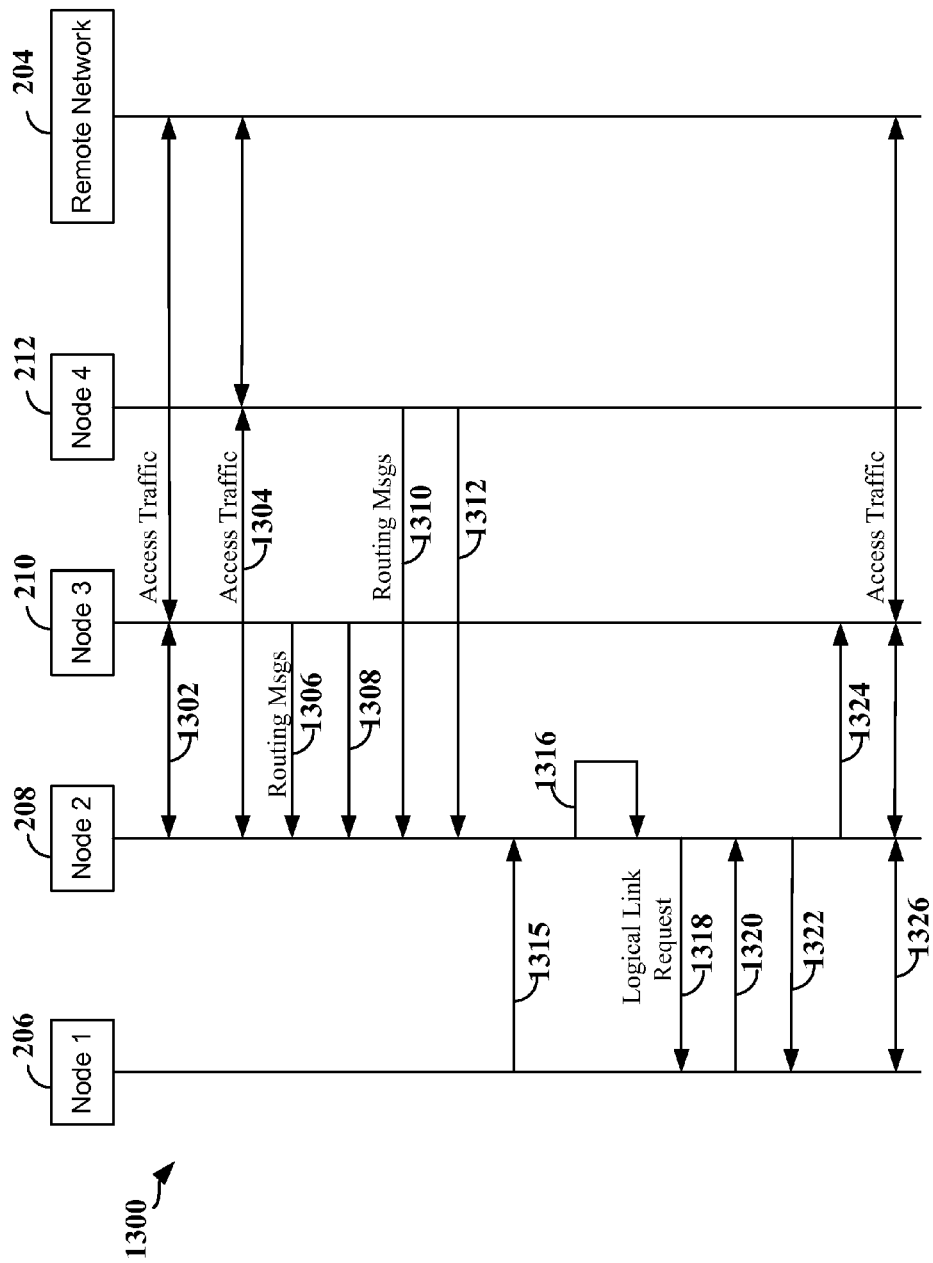
FIG. 13 is a call flow diagram illustrating a process for propagating a network routing domain to include a peer node, in accordance with some embodiments.

FIG. 13 is a call flow diagram illustrating a process 1300 for propagating a network routing domain to include a peer node, in accordance with some embodiments. FIG. 13 corresponds to FIGS. 7-8, and illustrates a process for extending network routing domain 302 to include network node 206. In this illustration, network node 208 is the node of concern, making the decision whether to extend the network routing domain to include network node 206. Here, at signals 1302 and 1304, network nodes 210 and 212 provide connectivity for network node 208 to the remote network 204 via respective network routing domains 302 and 304. As illustrated, network node 208 exchanges traffic with the remote network 204 through network node 210 via network routing domain 302 and through network node 212 via network routing domain 304.

To begin the evaluation algorithm for adding network node 206, at 1306, routing messages from network node 210 provide information (e.g., route metrics) related to a route between network node 208 and the remote network 204 via network routing domain 302. In addition, at 1308, link metrics related to the physical link(s) between network node 208 and network node 210 are also measured. Route metrics and link metrics related to the route between network node 208 and the remote network 204 via network node 212 and network routing domain 304 are further obtained at 1310 and 1312. Based on these route metrics and link metrics, respective path cost metrics may be determined for communication along the paths from network node 208 to remote network 204, by way of network node 210 and by way of network node 212, respectively.

Further, the quality of the physical link between network node 206 and network node 208 may be evaluated at 1314. Accordingly, a link metric from network node 206 to network node 208 may be derived. Based on the determined path cost metrics and link metric, respective aggregate path cost metrics may be derived for communication from network node 206 to the remote network 204 through each of the respective network routing domains 302 and 304. Accordingly, at 1316, network node 208 may select network routing domain 302 to be propagated to network node 206.

In one example, the aggregate path cost metrics for each network routing domain are ranked and the network routing domain with the lowest (or best) aggregate path cost metric may be selected for propagation to network node 206. In other examples, the aggregate path cost metric for each network routing domain may be compared with first path cost threshold (e.g., a predetermined threshold) $T_{add}$. Here, if neither derived aggregate path cost metric compares favorably with $T_{add}$ (e.g., neither aggregate path cost metric $\leq T_{add}$), then network node 208 may determine to not add network node 206 to either of the network routing domains. If only one aggregate path cost metric is less than the threshold $T_{add}$, then the corresponding network routing domain (e.g., network routing domain 302) may be propagated to include network node 206. If both aggregate path cost metrics are less than the threshold $T_{add}$, then either one or both network routing domains may be propagate to include network node 206. In the case that only one network routing domain is to be propagated, the selection of this domain may be based on a ranking of the aggregated path cost metrics for both domains. Of course, in scenarios with more than two candidate network routing domains, these same principles may be applied, and any suitable subset of the candidate network routing domains may be selected utilizing such a ranking of aggregate path cost metrics.

Referring again to FIG. 13, to propagate network routing domain 302 to network node 206, at 1318, network node 208 may transmit to network node 206 a request to establish a logical link for network routing domain 302. In response, at 1320, network node 206 may create the logical link between network node 206 and 208 and transmit over the logical link, a routing message to network node 208 to provide the network address for network node 206 on network routing domain 302. At 1322, network node 208 may transmit to network node 206 over the logical link for routing domain 302, a routing message indicating route metrics and/or path cost metrics related to the route between network node 208 and the remote network 204 via the network routing domain 302 and link metrics related to the physical link between network node 208 and network node 206. At 1324, network node 208 may further transmit a routing message to network node 210 in network routing domain 302 indicating route metrics and/or link metrics related to a peer route/link to network node 206. Accordingly, at 1326, traffic may be forwarded between network node 206 and the remote network 204 over a peer route therebetween via network nodes 208 and 210, as illustrated.

Figure 14:
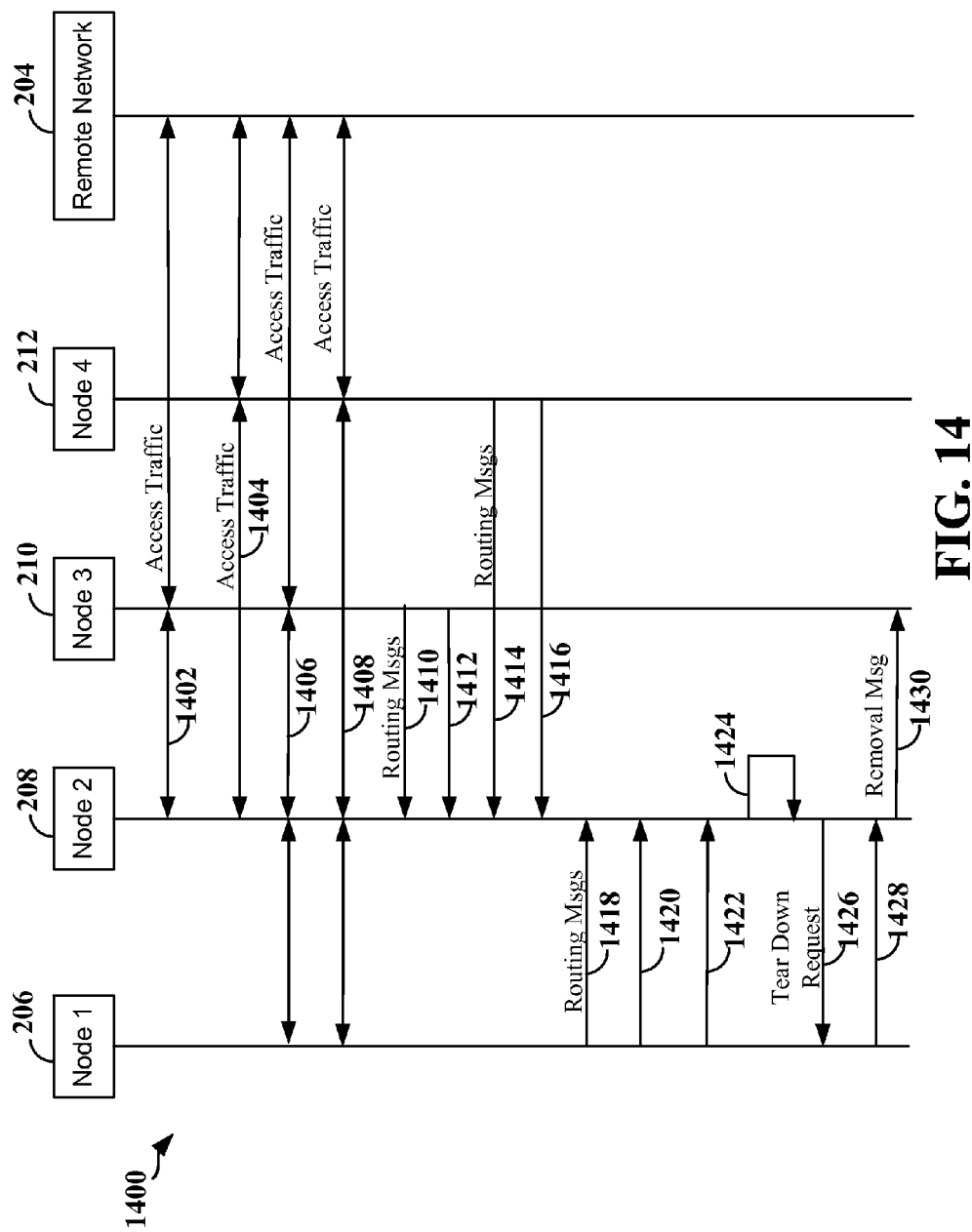
FIG. 14 is a call flow diagram illustrating a process for removing a network node from a network routing domain in accordance with some embodiments.

FIG. 14 is a call flow diagram illustrating a process 1400 for removing a node from a network routing domain in accordance with some embodiments. For example, FIG. 14 generally corresponds to FIGS. 10-11, and illustrates a process for removing network node 206 from a network routing domain. However, in FIGS. 10-11, network node 206 is removed from network routing domain 304, whereas in FIG. 14, network node 206 is removed from network routing domain 302.

As seen in this illustration of FIG. 14, network node 208, which maintains a logical link with network node 206 for communication over network routing domain 302, makes the decision to remove network node 206 from network routing domain 302. Here, at signals 1402 and 1404, network nodes 210 and 212 provide connectivity for network node 208 to the remote network 204 via respective network routing domains 302 and 304. As illustrated, network node 208 exchanges traffic with the remote network 204 through network node 210 via network routing domain 302 and through network node 212 via network routing domain 304. In addition, at signals 1406 and 1408, network node 208, together with network nodes 210 and 212, provide connectivity for network node 206 to the remote network 204 via respective network routing domains 302 and 304. As illustrated, network node 206 exchanges traffic with the remote network 204 through network nodes 208 and 210 via network routing domain 302 and through network nodes 208 and 212 via network routing domain 304.

To begin the evaluation algorithm for truncating network node 206, at 1410, routing messages from network node 210 provide information (e.g., route metrics) related to a route between network node 208 and the remote network 204 via network routing domain 302. In addition, at 1412, link metrics related to the physical link(s) between network node 208 and network node 210 are also measured. Route metrics and link metrics related to the route between network node 208 and the remote network 204 via network node 212 and network routing domain 304 are further obtained at 1414 and 1416. Based on these route metrics and link metrics, respective path cost metrics may be determined for communication along the paths from network node 208 to remote network 204, by way of network node 210 and by way of network node 212, respectively.

Further, at 1418 and 1420, routing messages from network node 206 provide information (e.g., route metrics) related to respective routes between network node 206 and the remote network 204 via logical links associated with each of the network routing domains 302 and 304 between network nodes 206 and 208. In addition, the quality of the physical link between network node 206 and network node 208 may be evaluated at 1422. Accordingly, respective route metrics and a link metric between network node 206 and network node 208 may be derived. Based on the determined path cost metrics, route metrics and link metric, respective aggregate path cost metrics may be derived for communication from network node 206 to the remote network 204 through each of the respective network routing domains 302 and 304. Accordingly, at 1424, network node 208 may determine from the aggregate path cost metrics that network node 206 should be truncated from network routing domain 302.

In one example, the aggregate path cost metrics for each network routing domain are ranked and the network routing domain with the highest (or worst) aggregate path cost metric may be selected for truncation from network node 206. In other examples, the aggregate path cost metric for each network routing domain may be compared with a second path cost threshold (e.g., a predetermined threshold) $T_{drop}$. Here, if neither derived aggregate path cost metric compares unfavorably with $T_{drop}$ (e.g., neither aggregate path cost metric $\geq T_{drop}$), then network node 208 may determine to not truncate network node 206 from either of the network routing domains. If only one aggregate path cost metric is greater than the threshold $T_{drop}$, then network node 206 may be truncated from the corresponding network routing domain (e.g., network routing domain 302). If both aggregate path cost metrics are greater than the threshold $T_{drop}$, then the network node 206 may be truncated from either one or both network routing domains. In the case that the network node 206 may be truncated from only one network routing domain, the selection of this domain may be based on a ranking of the aggregated path cost metrics for both domains. Of course, in scenarios with more than two candidate network routing domains, these same principles may be applied, and any suitable subset of the candidate network routing domains may be selected utilizing such a ranking of aggregate path cost metrics.

In some aspects of the disclosure, the $T_{drop}$ threshold for removing a node from a domain may be higher (greater than) the $T_{add}$ threshold for adding a node to a domain. In other aspects, the $T_{drop}$ threshold may include a hysteresis parameter added to the $T_{add}$ threshold. In this way, ping-pong effects, where a node is repeatedly added and released to/from a network routing domain, can be reduced or avoided.

Referring again to FIG. 14, to truncate network node 206 from network routing domain 302, at 1426, network node 208 may transmit to network node 206 a request to tear down the logical link for network routing domain 302 between network nodes 206 and 208. In response, at 1428, network node 206 may tear down the logical link and send a confirmation message to network node 208 confirming that the logical link has been torn down. At 1430, network node 208 may transmit a routing message to network node 210 in network routing domain 302 indicating that network node 206 has been removed from network routing domain 302.

Figure 15:
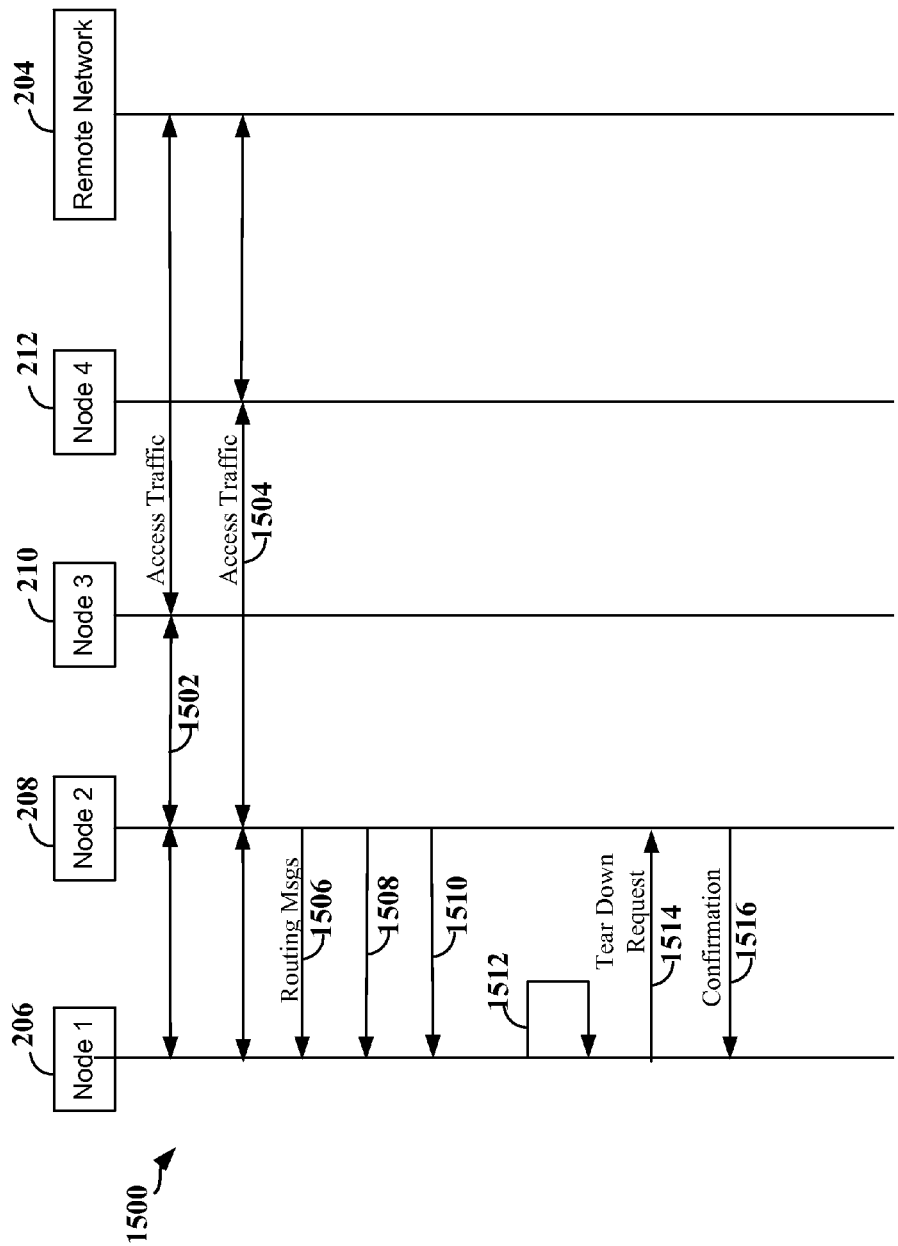
FIG. 15 is a call flow diagram illustrating a process for a network node to remove itself from a network routing domain in accordance with some embodiments.

FIG. 15 is a call flow diagram illustrating a process 1500 for removing a node from a network routing domain in accordance with some embodiments. Again, FIG. 15 generally corresponds to FIGS. 10-11, except that network node 206 is removed from network routing domain 302, not network routing domain 304. As seen in the illustration of FIG. 15, network node 206 makes the decision to remove itself from network routing domain 302.

Here, at signals 1502 and 1504, network node 208, together with network nodes 210 and 212, provide connectivity for network node 206 to the remote network 204 via respective network routing domains 302 and 304. As illustrated, network node 206 exchanges traffic with the remote network 204 through network nodes 208 and 210 via network routing domain 302 and through network nodes 208 and 212 via network routing domain 304

To begin the evaluation algorithm for truncating network node 206, at 1506 and 1508, routing messages from network node 208 provide information (e.g., route metrics) related to respective routes between network node 206 and the remote network 204 via network routing domains 302 and 304. In addition, at 1510, link metrics related to the physical link(s) between network node 208 and network node 206 are also measured. Based on these route metrics and link metrics, respective aggregate path cost metrics may be determined for communication along the paths from network node 206 to remote network 204, by way of network node 210 via network node 208 and by way of network node 212 via network node 208, respectively.

Accordingly, at 1512, network node 206 may determine from the aggregate path cost metrics that it should be truncated from network routing domain 302. The decision to truncate itself from network routing domain 302 may be based on a ranking of the aggregate path cost metrics and/or a comparison of the aggregate path cost metrics with $T_{drop}$, as described above.

Once network node 206 has decided to truncate itself from network routing domain 302, at 1514, network node 206 may transmit to network node 208 a request to tear down the logical link for network routing domain 302 between network nodes 206 and 208. In response, at 1516, network node 208 may tear down the logical link and send a confirmation message to network node 206 confirming that the logical link has been torn down.

Figure 16:
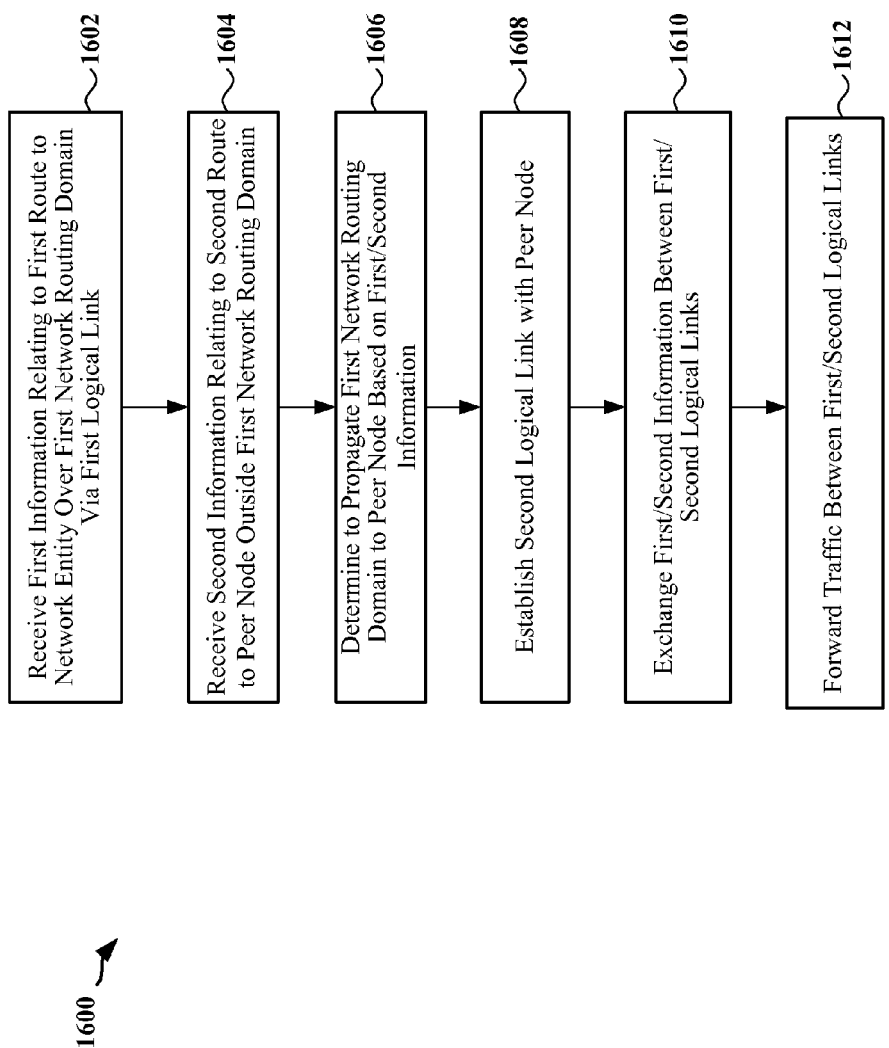
FIG. 16 is a flow chart of a method of managing a network routing domain within a communication network in accordance with some embodiments.

FIG. 16 is a flow chart of a method 1600 of managing a network routing domain within a communication network in accordance with some embodiments. The method may be performed by a network node, such as an IAB node, as described above and illustrated in FIG. 4, by a processor or processing system, or by any suitable means for carrying out the described functions.

At block 1602, the network node receives first information related to a first route from the network node to a network entity over a first network routing domain via a first logical link associated with the first network routing domain. The network entity may correspond to a remote network or a destination node within the remote network or within the first network routing domain. The first information may include, for example, route metrics related to the first route, link metrics related to at least one physical link along the first route and/or domain metrics related to the first network routing domain.

At block 1604, the network node further receives second information related to a second route between the network node and a peer node outside of the first network routing domain. In some examples, the network node has physical connectivity to the peer node via one or more physical links, and the second information includes at least one link metric related to the one or more physical links between the network node and the peer node. In an aspect, the one or more physical links between the network node and the peer node includes a wireless link.

At block 1606, the network node determines to propagate the first network routing domain to the peer node based on the first information and the second information. In some examples, the network node derives an aggregate path cost metric from the first and second information and determines to propagate the first network routing domain to the peer node when the aggregate path cost metric compares favorably with a first path cost threshold (e.g., an add threshold).

At block 1608, the network node establishes a second logical link with the peer node for the first network routing domain. The second logical link may be overlaid on one of the physical links between the network node and the peer node. At block 1610, the first and second information is exchanged between the first and second logical links to provide updated routing and link information for the first network routing domain to the peer node. At 1612, traffic on the first network routing domain may be forwarded between the first and second logical links.

Figure 17:
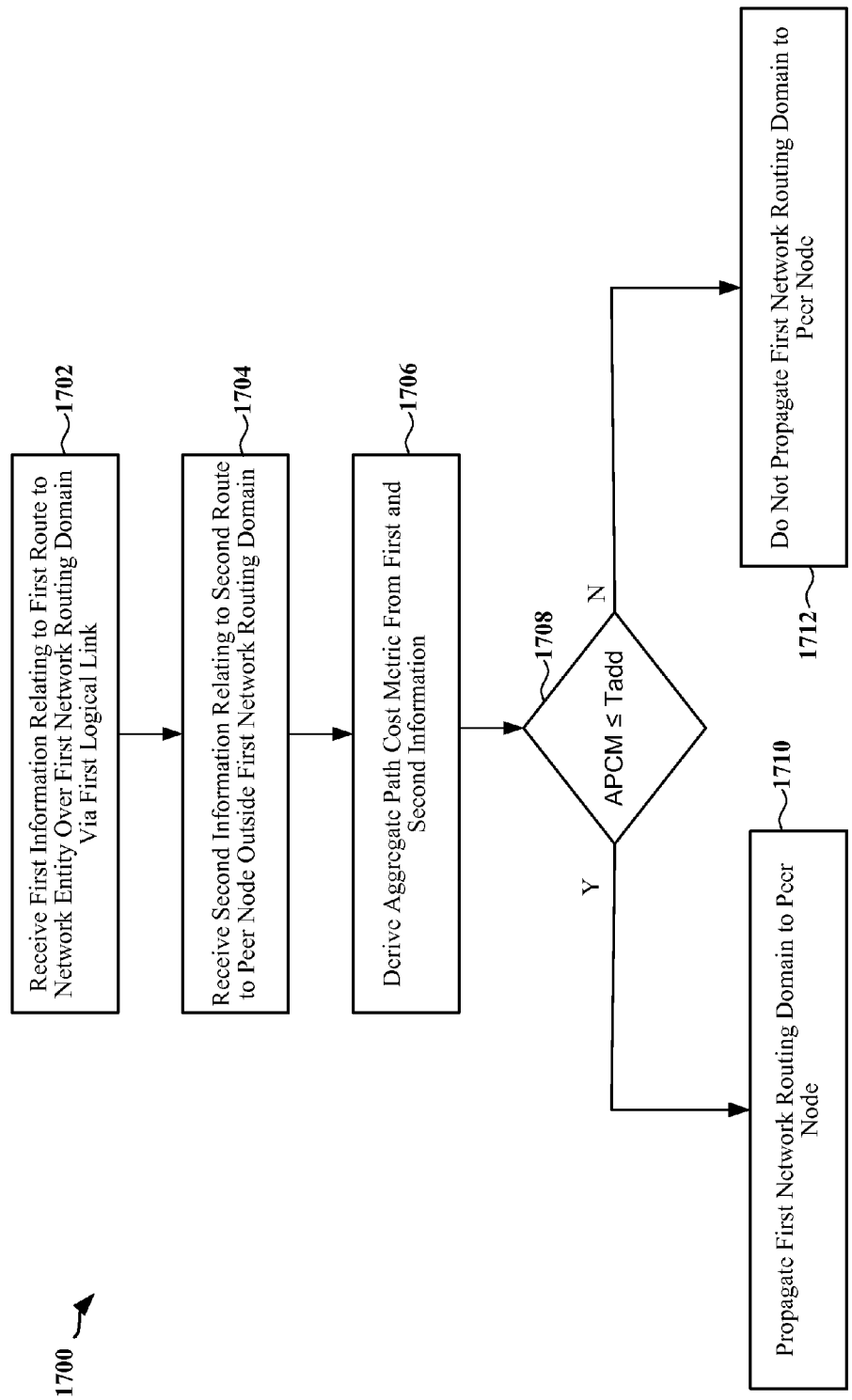
FIG. 17 is a flow chart of a method of propagation of a network routing domain to a network node in accordance with some embodiments.

FIG. 17 is a flow chart of a method 1700 of propagation of a network routing domain to a network node in accordance with some embodiments. The method may be performed by a network node, such as an IAB node, as described above and illustrated in FIG. 4, by a processor or processing system, or by any suitable means for carrying out the described functions.

At block 1702, the network node receives first information related to a first route from the network node to a network entity over a first network routing domain via a first logical link associated with the first network routing domain. The network entity may correspond to a remote network or a destination node within the remote network or within the first network routing domain. The first information may include, for example, route metrics related to the first route, link metrics related to at least one physical link along the first route and/or domain metrics related to the first network routing domain.

At block 1704, the network node further receives second information related to a second route between the network node and a peer node outside of the first network routing domain. In some examples, the network node has physical connectivity to the peer node via one or more physical links, and the second information includes at least one link metric related to the one or more physical links between the network node and the peer node. In an aspect, the one or more physical links between the network node and the peer node includes a wireless link.

At block 1706, the network node derives an aggregate path cost metric from the first and second information, and at block 1708, compares the aggregate path cost metric with a first path cost threshold (Tadd). When the aggregate path cost metric is less than Tadd, at block 1710, the network node propagates the first network routing domain to the peer node. Otherwise, at block 1712, the first network routing domain is not propagated to the peer node.

FIG. 18 is a flow chart of a method 1800 of truncation of a network node from a network routing domain in accordance with some embodiments. The method may be performed by a network node, such as an IAB node, as described above and illustrated in FIG. 4, by a processor or processing system, or by any suitable means for carrying out the described functions.

At block 1802, the network node receives first information related to a first route from the network node to a network entity over a first network routing domain via a first logical link associated with the first network routing domain. The network entity may correspond to a remote network or a destination node within the remote network or within the first network routing domain. The first information may include, for example, route metrics related to the first route, link metrics related to at least one physical link along the first route and/or domain metrics related to the first network routing domain.

At block 1804, the network node further receives second information related to a second route between the network node and a peer node within the first network routing domain. In some examples, the network node has physical connectivity to the peer node via one or more physical links, and the second information includes at least one link metric related to the one or more physical links between the network node and the peer node. In an aspect, the one or more physical links between the network node and the peer node includes a wireless link.

At block 1806, the network node derives an aggregate path cost metric from the first and second information, and at block 1808, compares the aggregate path cost metric with a second path cost threshold (Tdrop). When the aggregate path cost metric is greater than Tdrop, at block 1810, the network node truncates the peer node from the first network routing domain. Otherwise, at block 1812, the peer node is not truncated from the first network routing domain.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-18 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-18 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method for managing a first network routing domain within a communication network, operable at a network node having connectivity to a network entity utilizing a first logical link associated with the first network routing domain, the method comprising:
   receiving first information relating to a first route between the network node and the network entity via the first network routing domain;
   receiving second information relating to a second route between the network node and a first peer node outside of the first network routing domain;
   determining to extend the first network routing domain to the first peer node, based on the first information and the second information;
   establishing a second logical link with the first peer node, the second logical link associated with the first network routing domain;
   exchanging the first information and the second information between the first logical link and the second logical link; and
   forwarding traffic between the first logical link and the second logical link utilizing a first peer route derived from the first information and the second information.

2. The method of claim 1, further comprising:
   providing connectivity to the network entity utilizing a third logical link associated with a second network routing domain within the communication network;

receiving third information related to a third route between the network node and the network entity via the second network routing domain; and selecting at least the first network routing domain to be extended to the first peer node based on the first information, the second information, and the third information.

3. The method of claim 2, wherein the selecting at least the first network routing domain to be extended to the first peer node further comprises:

selecting both the first network routing domain and the second network routing domain to be extended to the first peer node based on the first information, the second information, and the third information;

establishing a fourth logical link with the first peer node, the fourth logical link associated with the second network routing domain;

exchanging the second information and the third information between the third logical link and the fourth logical link; and forwarding traffic between the third logical link and the fourth logical link utilizing a second peer route derived from the second information and the third information.

4. The method of claim 2, wherein the selecting at least the first network routing domain to be extended to the first peer node further comprises:

selecting the first network routing domain to be extended to the first peer node over the second network routing domain based on the first information and the third information.

5. The method of claim 4, wherein selecting the first network routing domain over the second network routing domain is based on a comparison between a first aggregate path cost metric based on the first information and the second information and a second aggregate path cost metric based on the second information and the third information.

6. The method of claim 1, wherein determining to extend the first network routing domain to the first peer node further comprises:

determining a first aggregate path cost metric based on the first information and the second information; and determining to extend the first network routing domain to the first peer node when the first aggregate path cost metric compares favorably with a first path cost threshold.

7. The method of claim 1, wherein the first information comprises at least one of route metrics related to the first route, link metrics related to at least one physical link along the first route or domain metrics related to the first network routing domain.

8. The method of claim 1, wherein the second information comprises at least one link metric related to a link quality of a physical link between the network node and the first peer node.

9. The method of claim 8, wherein the second logical link is overlaid on the physical link.

10. The method of claim 8, wherein the physical link between the network node and the first peer node is a wireless link.

11. The method of claim 1, wherein the network entity corresponds to a remote network or a destination node within the first network routing domain or within the remote network.

12. The method of claim 1, wherein the network node is an integrated access backhaul (IAB) node and the communication network is an TAB network.

13. The method of claim 1, further comprising:

determining, based on the first information and fourth information relating to a fourth route between the network node and a second peer node within the first network routing domain, to remove the second peer node from the first network routing domain; and tearing down a fifth logical link associated with the first network routing domain between the network node and the second peer node.

14. The method of claim 13, wherein the determining to remove the second peer node further comprises:

determining a third path cost metric based on the first information and the fourth information; and determining to remove the second peer node from the first network routing domain when the third path cost metric compares unfavorably with a second path cost threshold.

15. The method of claim 13, further comprising:

receiving fifth information related to a fifth route between the second peer node and the network entity via a second network routing domain; and selecting the second peer node to be removed from the first network routing domain over the second network routing domain based on the first information, the fourth information, and the fifth information.

16. The method of claim 1, further comprising:

providing a fifth logical link associated with the first network routing domain between the network node and a second peer node; and tearing down at least the fifth logical link associated with the first network routing domain upon the second peer node determining to remove itself from the first network routing domain.

17. A network node within a communication network, comprising:

a wireless transceiver configured to communicate with a network entity via a first logical link overlaid on a wireless link, the first logical link associated with a first network routing domain;

at least one processor communicatively coupled to the wireless transceiver, the at least one processor configured to:

receive first information relating to a first route between the network node and the network entity via the first network routing domain;

receive second information relating to a second route between the network node and a first peer node outside of the first network routing domain;

determine to extend the first network routing domain to the first peer node, based on the first information and the second information;

establish a second logical link with the first peer node, the second logical link associated with the first network routing domain;

exchange the first information and the second information between the first logical link and the second logical link; and forward traffic between the first logical link and the second logical link utilizing a first peer route derived from the first information and the second information.

18. The network node of claim 17, wherein the at least one processor is further configured to:

provide connectivity to the network entity utilizing a third logical link associated with a second network routing domain within the communication network;

receive third information related to a third route between the network node and the network entity via the second network routing domain; and select at least the first network routing domain to be extended to the first peer node based on the first information, the second information, and the third information.

19. The network node of claim 18, wherein the at least one processor is further configured:

select both the first network routing domain and the second network routing domain to be extended to the first peer node based on the first information, the second information, and the third information;

establish a fourth logical link with the first peer node, the fourth logical link associated with the second network routing domain;

exchange the second information and the third information between the third logical link and the fourth logical link; and forward traffic between the third logical link and the fourth logical link utilizing a second peer route derived from the second information and the third information.

20. The network node of claim 18, wherein the at least one processor is further configured to:

select the first network routing domain to be extended to the first peer node over the second network routing domain based on the first information and the third information.

21. The network node of claim 20, wherein the at least one processor is further configured to:

select the first network routing domain over the second network routing domain based on a comparison between a first aggregate path cost metric based on the first information and the second information and a second aggregate path cost metric based on the second information and the third information.

22. The network node of claim 17, wherein the at least one processor is further configured to:

determine a first aggregate path cost metric based on the first information and the second information; and determine to extend the first network routing domain to the first peer node when the first aggregate path cost metric compares favorably with a first path cost threshold.

23. The network node of claim 17, wherein the at least one processor is further configured to:

determine, based on the first information and fourth information relating to a fourth route between the network node and a second peer node within the first network routing domain, to remove the second peer node from the first network routing domain; and tear down a fifth logical link associated with the first network routing domain between the network node and the second peer node.

24. The network node of claim 17, wherein the at least one processor is further configured to:

provide a fifth logical link associated with the first network routing domain between the network node and a second peer node; and tear down at least the fifth logical link associated with the first network routing domain upon the second peer node determining to remove itself from the first network routing domain.

25. A network node within a communication network having connectivity to a network entity utilizing a first logical link associated with a first network routing domain, the network node comprising:

means for receiving first information relating to a first route between the network node and the network entity via the first network routing domain;

means for receiving second information relating to a second route between the network node and a first peer node outside of the first network routing domain;

means for determining to extend the first network routing domain to the first peer node, based on the first information and the second information;

means for establishing a second logical link with the first peer node, the second logical link associated with the first network routing domain;

means for exchanging the first information and the second information between the first logical link and the second logical link; and means for forwarding traffic between the first logical link and the second logical link utilizing a first peer route derived from the first information and the second information.

26. The network node of claim 25, further comprising:

means for providing connectivity to the network entity utilizing a third logical link associated with a second network routing domain within the communication network;

means for receiving third information related to a third route between the network node and the network entity via the second network routing domain; and means for selecting at least the first network routing domain to be extended to the first peer node based on the first information, the second information, and the third information.

27. The network node of claim 25, further comprising:

means for determining, based on the first information and fourth information relating to a fourth route between the network node and a second peer node within the first network routing domain, to remove the second peer node from the first network routing domain; and means for tearing down a fifth logical link associated with the first network routing domain between the network node and the second peer node.

28. A non-transitory computer-readable medium storing computer executable code, comprising code for:

receiving first information relating to a first route between a network node and a network entity via a first network routing domain within a communication network, the network node having connectivity to the network entity via a first logical link associated with the first network routing domain;

receiving second information relating to a second route between the network node and a first peer node outside of the first network routing domain;

determining to extend the first network routing domain to the first peer node, based on the first information and the second information;

establishing a second logical link with the first peer node, the second logical link associated with the first network routing domain;

exchanging the first information and the second information between the first logical link and the second logical link; and forwarding traffic between the first logical link and the second logical link utilizing a first peer route derived from the first information and the second information.

29. The non-transitory computer-readable medium of claim 28, further comprising code for:

providing connectivity to the network entity utilizing a third logical link associated with a second network routing domain within the communication network;

receiving third information related to a third route between the network node and the network entity via the second network routing domain; and selecting at least the first network routing domain to be extended to the first peer node based on the first information, the second information, and the third information.

30. The non-transitory computer-readable medium of claim 28, further comprising code for:

determining, based on the first information and fourth information relating to a fourth route between the network node and a second peer node within the first network routing domain, to remove the second peer node from the first network routing domain; and tearing down a fifth logical link associated with the first network routing domain between the network node and the second peer node.

* * * * *